US010614009B2

(12) United States Patent
Mishra et al.

(10) Patent No.: US 10,614,009 B2
(45) Date of Patent: Apr. 7, 2020

(54) ASYNCHRONOUS INTERRUPT WITH SYNCHRONOUS POLLING AND INHIBIT OPTIONS ON AN RFFE BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Helena Deirdre O'Shea, San Diego, CA (US); Wolfgang Roethig, San Jose, CA (US); Christopher Kong Yee Chun, Austin, TX (US); ZhenQi Chen, South Boston, MA (US); Scott Davenport, Merrimack, NH (US); Chiew-Guan Tan, San Diego, CA (US); Wilson Chen, San Diego, CA (US); Umesh Srikantiah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/262,267

(22) Filed: Jan. 30, 2019

(65) Prior Publication Data
US 2019/0286587 A1    Sep. 19, 2019

Related U.S. Application Data

(60) Provisional application No. 62/644,287, filed on Mar. 16, 2018, provisional application No. 62/680,496, filed on Jun. 4, 2018.

(51) Int. Cl.
*G06F 3/00*       (2006.01)
*G06F 13/24*      (2006.01)
(Continued)

(52) U.S. Cl.
CPC .............. *G06F 13/24* (2013.01); *G06F 13/42* (2013.01); *G06F 13/4291* (2013.01); *H04B 1/12* (2013.01); *G06F 2213/36* (2013.01)

(58) Field of Classification Search
CPC ............................ G06F 13/24; G06F 13/4291
(Continued)

(56) References Cited

U.S. PATENT DOCUMENTS

2015/0100713 A1\*  4/2015  Sengoku ............. G06F 13/4291
                                                              710/110
2015/0199287 A1\*  7/2015  Sengoku ................. G06F 13/24
                                                              710/110
(Continued)

FOREIGN PATENT DOCUMENTS

WO        2017172269 A1    10/2017

OTHER PUBLICATIONS

International Search Report and Written Opinion—PCT/US2019/016037—ISA/EPO—dated Apr. 23, 2019.

Primary Examiner — Chun Kuan Lee
(74) Attorney, Agent, or Firm — Loza & Loza LLP

(57)                ABSTRACT

Systems, methods, and apparatus for data communication are provided. A method performed by a bus master includes terminating transmission of a first datagram by signaling a first bus park cycle on a serial bus, causing a driver to enter a high-impedance state, opening an interrupt window by providing a first edge in a clock signal transmitted on a second line of the serial bus, closing the interrupt window by providing a second edge in the clock signal, signaling a second bus park cycle on the serial bus, initiating an arbitration process when an interrupt was received on the first line of the serial bus while the interrupt window was open, and initiating a transmission of a second datagram
(Continued)

when an interrupt was not received on the first line of the serial bus while the interrupt window was open.

30 Claims, 17 Drawing Sheets

(51) Int. Cl.
*G06F 13/42* (2006.01)
*H04B 1/12* (2006.01)

(58) Field of Classification Search
USPC .............................................. 710/5
See application file for complete search history.

(56) References Cited

U.S. PATENT DOCUMENTS

| 2015/0199295 | A1* | 7/2015 | Sengoku | G06F 13/4234 |
| | | | | 710/110 |
| 2017/0371830 | A1 | 12/2017 | Pitigoi-Aron | |
| 2018/0032457 | A1 | 2/2018 | Mishra et al. | |
| 2018/0060272 | A1 | 3/2018 | Mishra et al. | |

* cited by examiner

ASYNCHRONOUS INTERRUPT WITH SYNCHRONOUS POLLING AND INHIBIT OPTIONS ON AN RFFE BUS

PRIORITY CLAIM

This application claims priority to and the benefit of U.S. Provisional Patent Application Ser. No. 62/644,287 filed in the U.S. Patent Office on Mar. 16, 2018 and of U.S. Provisional Patent Application Ser. No. 62/680,496 filed in the U.S. Patent Office on Jun. 4, 2018, the entire content of these applications being incorporated herein by reference as if fully set forth below in its entirety and for all applicable purposes.

TECHNICAL FIELD

The present disclosure relates generally to communication devices, and more particularly, to in-band interrupts for communications links connecting integrated circuit devices within an apparatus.

BACKGROUND

Serial interfaces have become the preferred method for digital communication between integrated circuit (IC) devices in various apparatus. For example, mobile communications equipment may perform certain functions and provide capabilities using IC devices that include radio frequency transceivers, cameras, display systems, user interfaces, controllers, storage, and the like. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as the I3C interface and the radio frequency front-end (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links. Certain functions can be shared among the front-end devices and the RFFE interface enables concurrent and/or parallel operation of transceivers using multi-master, multi-slave configurations.

As the demand for improved communications between devices continues to increase, there exists a need for improvements in protocols and methods used for managing the interfaces between RF front-end devices.

SUMMARY

Certain aspects of the disclosure relate to systems, apparatus, methods and techniques for implementing and managing digital communication interfaces that may be used between IC devices in various apparatus. In some aspects, the digital communication interfaces provide multi-wire communication links between the IC devices. In one example, a multi-wire communication link may transport serialized data on one or more wires of a communication link. According to one aspect, techniques, apparatus and methods are provided that enable devices to generate and initiate in-band interrupt processing.

In various aspects of the disclosure, a method performed by a device operating as a bus master may include terminating transmission of a first datagram by signaling a first bus park cycle on a serial bus, causing a driver of a first line of the serial bus to enter a high-impedance state, monitoring the serial bus during an interrupt window that is opened at a time corresponding to a first edge in a clock signal transmitted on a second line of the serial bus and closed at a time corresponding to a second edge in the clock signal, signaling a second bus park cycle on the serial bus, initiating an arbitration process when an interrupt was received on the first line of the serial bus during the interrupt window, and initiating a transmission of a second datagram when an interrupt was not received on the first line of the serial bus during the interrupt window. In one example, the serial bus is operated in accordance with an RFFE protocol. In other examples, the serial bus is operated in accordance with an SPMI protocol, I3C protocol, I2C protocol or other serial protocol.

In one aspect, the interrupt window is opened at a rising edge of a first pulse in the clock signal. The interrupt window may be closed at a rising edge of a second pulse in the clock signal. The interrupt window may be closed at a falling edge of a second pulse in the clock signal. The interrupt window may be closed at a falling edge of the first pulse in the clock signal when the first pulse in the clock signal has a duration that is greater than a period of the clock signal transmitted when the second datagram is transmitted.

In certain aspects, the interrupt window is opened at a rising edge of a first pulse in the clock signal and closed at an edge of a second pulse in the clock signal. The method may include providing at least one additional pulse in the clock signal after the first pulse and before the second pulse. One or more devices coupled to the serial bus may be configured to launch an interrupt upon detecting a rising edge of the at least one additional pulse.

In one aspect, the arbitration process may be initiated by transmitting an interrupt sequence identification datagram over the serial bus. The method may include designating as a winner of the arbitration process, a device that transmits a highest-value address on the serial bus during the arbitration process or designating as a winner of the arbitration process, a device that transmits a lowest-value address on the serial bus during the arbitration process.

In one aspect, the method may include deterring assertion of an interrupt after transmitting a third datagram by suppressing edges in the clock signal between two bus park cycles provided after transmitting the third datagram.

In one aspect, the arbitration process may be initiated by providing a third edge in the clock signal, enabling a line driver concurrently with providing the third edge, providing a fourth edge in the clock signal, and disabling the line driver after providing the fourth edge. The third edge may include a transition of signaling state in a first direction and the fourth edge may include a transition of signaling state in the first direction. The third edge may include a transition of signaling state in a first direction and the fourth edge may include a transition of signaling state in a second direction.

In various aspects of the disclosure, an apparatus, has a bus interface adapted to couple the apparatus to a serial bus and a processing circuit. The processing circuit may be configured to terminate transmission of a first datagram by signaling a first bus park cycle on the serial bus, cause a driver of a first line of the serial bus to enter a high-impedance state, monitor the serial bus during an interrupt window that is opened at a time corresponding to a first edge in a clock signal transmitted on a second line of the serial bus and closed at a time corresponding to a second edge in the clock signal, signal a second bus park cycle on the serial bus, initiate an arbitration process when an interrupt was received on the first line of the serial bus during the interrupt window, and initiate a transmission of a second datagram when an interrupt was not received on the first line of the serial bus during the interrupt window. In one example, the serial bus is operated in accordance with an RFFE protocol. In other examples, the serial bus is operated in accordance with an SPMI protocol, I3C protocol, I2C protocol or other serial protocol.

In various aspects of the disclosure, a processor-readable storage medium has instructions stored thereon which, when executed by at least one processor or state machine of a processing circuit, cause the processing circuit to terminate transmission of a first datagram by signaling a first bus park cycle on a serial bus, cause a driver of a first line of the serial bus to enter a high-impedance state, monitor the serial bus during an interrupt window that is opened at a time corresponding to a first edge in a clock signal transmitted on a second line of the serial bus and closed at a time corresponding to a second edge in the clock signal, signal a second bus park cycle on the serial bus, initiate an arbitration process when an interrupt was received on the first line of the serial bus during the interrupt window, and initiate a transmission of a second datagram when an interrupt was not received on the first line of the serial bus during the interrupt window. In one example, the serial bus is operated in accordance with an RFFE protocol. In other examples, the serial bus is operated in accordance with an SPMI protocol, I3C protocol, I2C protocol or other serial protocol.

DETAILED DESCRIPTION

Figure 1:
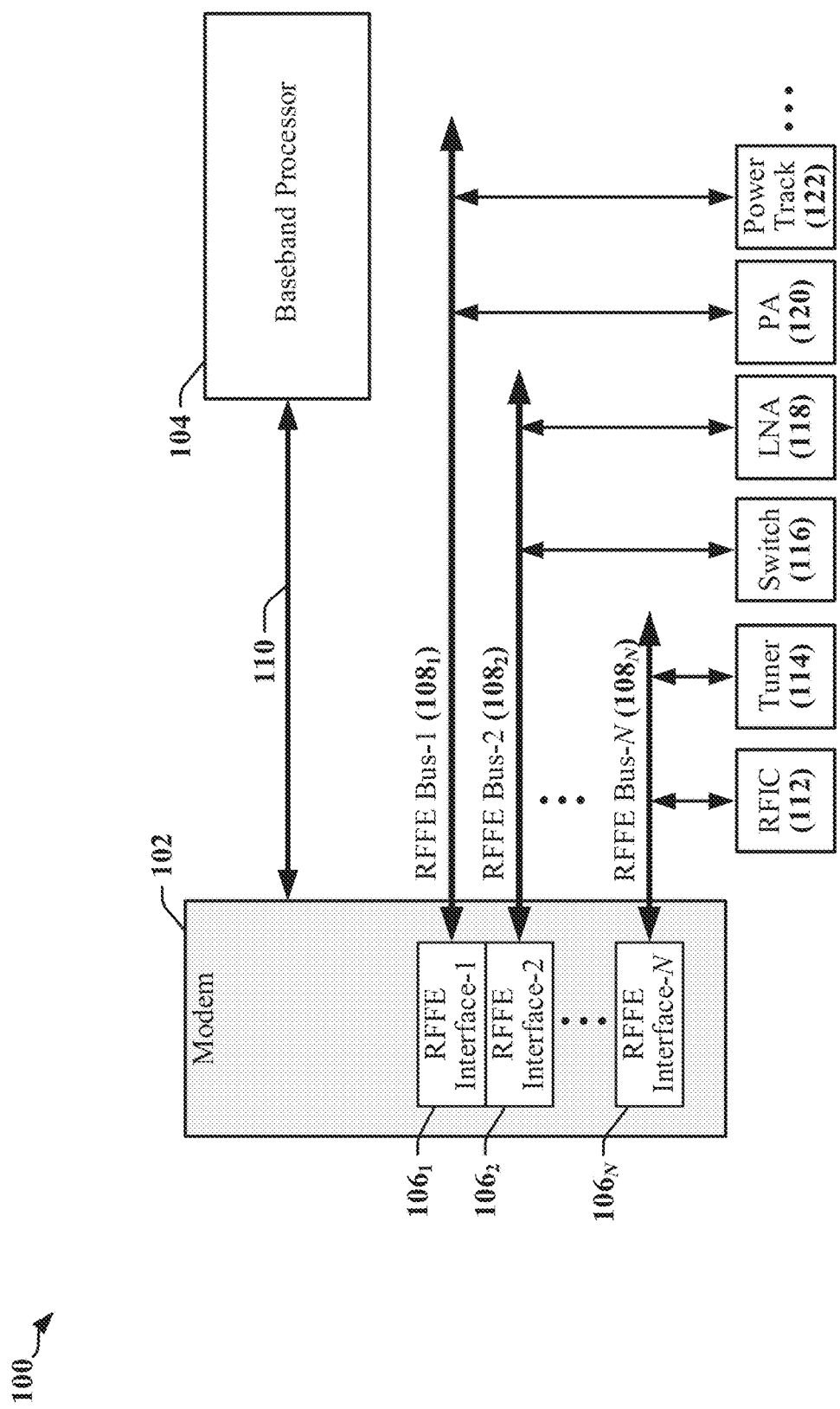
FIG. 1 illustrates a first example of a system that employs an RFFE bus that may be adapted in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

The Radio Frequency Front-End (RFFE) interface defined by the MIPI alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links. Emerging 5G RF Front-End circuits demand an ultrashort bus latency on the RFFE bus, where the latency may be less than 1 μs. Current RFFE implementations employ a packet structure that does not permit the RFFE bus to operate with the required latency.

RFFE defines a method by which devices may assert in-band interrupts. The defined method relies on polling by a bus owner device and latency associated with interrupts can generally not be specified or guaranteed. Certain aspects of the invention provide in-band interrupt techniques that can optimize latency and improve reliability of interrupt-based functions and applications.

In some instances, a method performed by a device operating as a bus master may include terminating transmission of a first datagram by signaling a first bus park cycle on a serial bus operated in accordance with a radio frequency front-end protocol, causing a driver of a first line of the serial bus to enter a high-impedance state, opening an interrupt window by providing a first edge in a clock signal transmitted on a second line of the serial bus, closing the interrupt window by providing a second edge in the clock signal, signaling a second bus park cycle on the serial bus, initiating an arbitration process when an interrupt was received on the first line of the serial bus while the interrupt window was open, and initiating a transmission of a second datagram when an interrupt was not received on the first line of the serial bus while the interrupt window was open.

Overview of the RFFE Bus

Certain aspects of the invention may be applicable to communication links deployed between electronic devices that include subcomponents of an apparatus such as a telephone, a mobile computing device, a wearable computing device, an appliance, automobile electronics, avionics systems, etc.

FIG. 1 illustrates a first example of a system 100 that can be implemented in a chipset, one or more SoCs and/or other configuration of devices. The system 100 employs multiple RFFE buses $108_1$-$108_N$ that can support communication between and with various front-end devices 112, 114, 116, 118, 120, 122. The system may include a modem 102 that can communicate through one or more RFFE interfaces $106_1$-$106_N$, each of which couples the modem 102 to a corresponding RFFE bus $108_1$-$108_N$. The modem 102 may communicate with a baseband processor 104 through a separate communication link 110. The illustrated device 102 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the system 100 may include one or more baseband processors 104, modems 102, multiple communications links 110, multiple RFFE buses $108_1$-$108_N$ and/or other types of buses. The system 100 may include other types of processors, circuits and/or modules, and may the system 100 may be configured for various operations and/or different functionalities. In the illustrated configuration, one RFFE bus $108_N$ is coupled to an RF integrated circuit (RFIC 112) and an RF tuner 114. The RFIC 112 may include one or more controllers, state machines and/or processors that configure and control certain aspects of the RF front-end. Another RFFE bus 1082 may couple the modem 102 to a switch 116 and a low noise amplifier (LNA 118). Another RFFE bus $108_1$ may couple the modem 102 to a power amplifier (PA 120) and a power tracking module 122. Other types of devices may be coupled by one or more of the RFFE buses $108_1$-$108_N$, and other assignments and allocations of devices 112, 114, 116, 118, 120, 122 to RFFE buses $108_1$-$108_N$ may be configured according to application needs.

Figure 2:
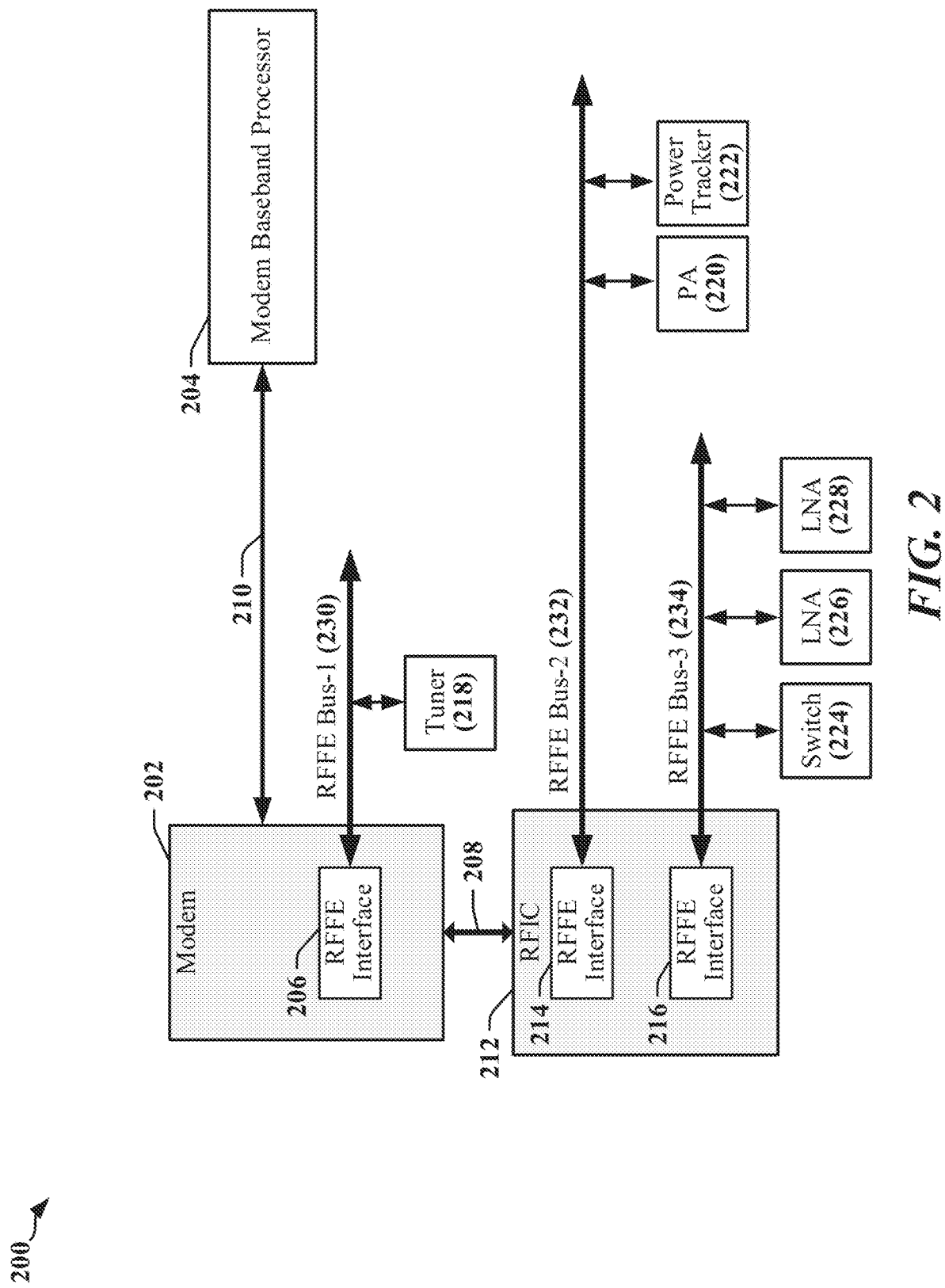
FIG. 2 illustrates a second example of a system that employs an RFFE bus that may be adapted in accordance with certain aspects disclosed herein.

FIG. 2 illustrates a second example of a system 200 that can be implemented in a chipset, one or more SoCs and/or other configuration of devices. The system 200 employs multiple RFFE buses 230, 232, 234 that can support communication between and with various RF front-end devices 218, 220, 222, 224, 226 228. In this system 200, a modem 202 includes an RFFE interface 206 that can couple the modem 202 to a first RFFE bus 230. The modem 202 may communicate with a baseband processor 204 and an RFIC 212 through one or more communication links 208, 210. The system 200 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the system 200 may include one or more baseband processors 204, modems 202, RFICs 212, multiple communications links 208, 210, multiple RFFE buses 230, 232, 234 and/or other types of buses. The device 202 may include other types of processors, circuits, modules and/or buses. The system 200 may be configured for various operations and/or different functionalities. In the system 200 illustrated in FIG. 2, the Modem is coupled to an RF tuner 218 through its RFFE interface 206 and the first RFFE bus 230. The RFIC 212 may include one or more RFFE interfaces 214, 216, controllers, state machines and/or processors that configure and control certain aspects of the RF front-end. The RFIC 212 may communicate with a PA 220 and a power tracking module 222 through a first of its RFFE interfaces 214 and the second RFFE bus 232. The RFIC 212 may communicate with a switch 224 and one or more LNAs 226, 228 through a second of its RFFE interfaces 216 and the third RFFE bus 234.

Figure 3:
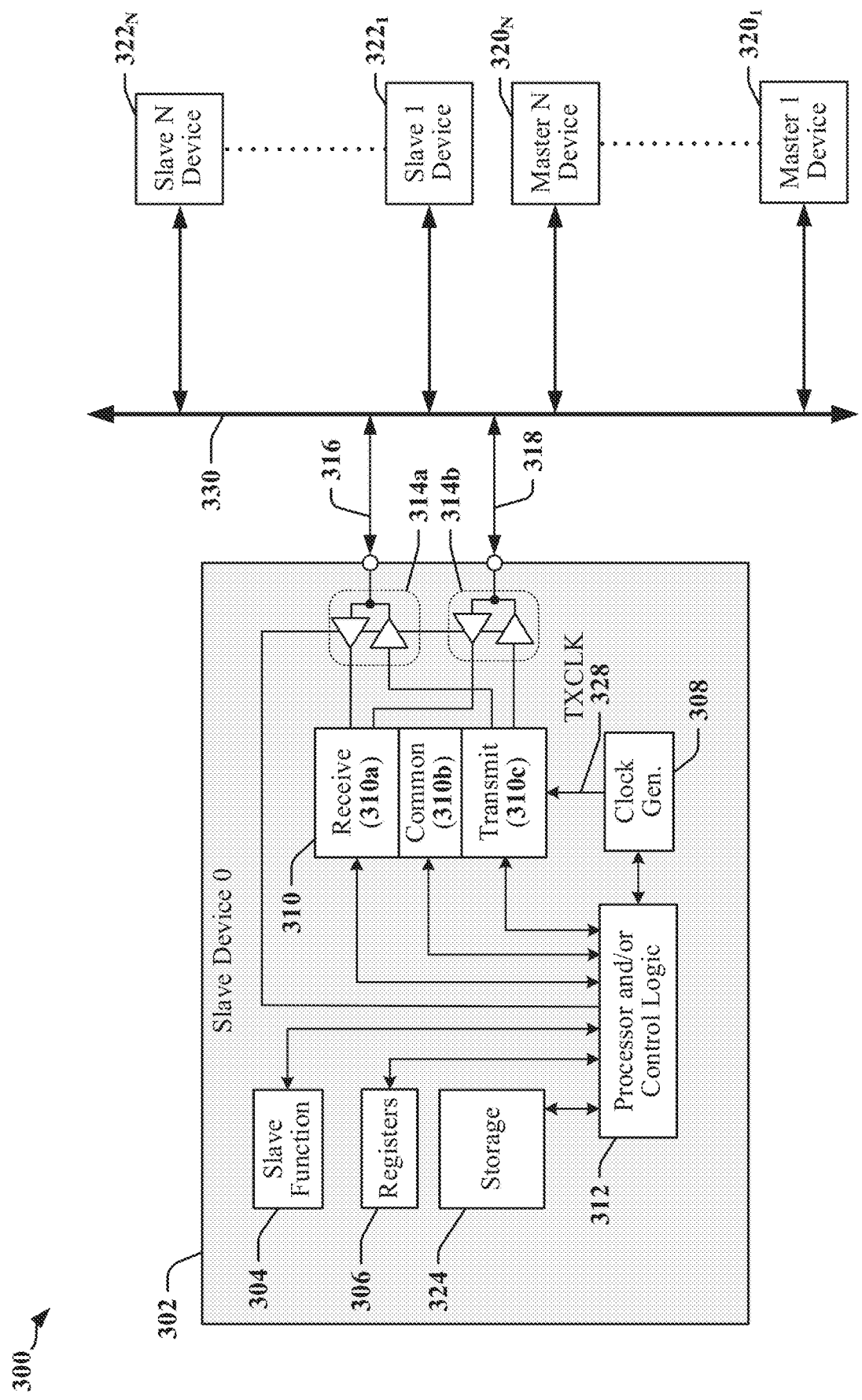
FIG. 3 illustrates an example of a system architecture for an apparatus employing a data link between IC devices according to certain aspects disclosed herein.

FIG. 3 illustrates an example of an architecture for a device 300 that may employ a communication link, such as an RFFE bus 330 to connect bus master devices $320_1$-$320_N$ and slave devices 302 and $322_1$-$322_N$. The RFFE bus 330 may be configured according to application needs, and access to multiple buses 330 may be provided to certain of the devices $320_1$-$320_N$, 302, and $322_1$-$322_N$. In operation, one of the bus master devices $320_1$-$320_N$ may gain control of the bus and transmit a slave identifier (slave address) to identify one of the slave devices 302 and $322_1$-$322_N$ to engage in a communication transaction. Bus master devices $320_1$-$320_N$ may read data and/or status from slave devices 302 and $322_1$-$322_N$, and may write data to memory or may configure the slave devices 302 and $322_1$-$322_N$. Configuration may involve writing to one or more registers or other storage on the slave devices 302 and $322_1$-$322_N$.

In the example illustrated in FIG. 3, a first slave device 302 coupled to the RFFE bus 330 may respond to one or more bus master devices $320_1$-$320_N$, which may read data from, or write data to the first slave device 302. Each slave device 302, $322_1$-$322_N$ may manage or perform one or more circuits, sensors or other functions 304. In one example, the first slave device 302 may include or control a power amplifier (see the PA 220 in FIG. 2), and one or more bus master devices $320_1$-$320_N$ may from time-to-time configure a gain setting at the first slave device 302.

The first slave device 302 may include configuration registers 306 and/or other storage devices 324, a processing circuit and/or control logic 312, a transceiver 310, and a number of line driver/receiver circuits 314a, 314b as needed to couple the first slave device 302 to the RFFE bus 330. The processing circuit and/or control logic 312 may include a processor such as a state machine, sequencer, signal processor or general-purpose processor. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A clock generation circuit 308 may provide a transmit clock (TXCLK) signal 328 to the transmitter 310c, where the TXCLK signal 328 can be used to determine data transmission rates.

The RFFE bus 330 is typically implemented as a serial bus in which data is converted from parallel to serial form by a transmitter, which transmits the encoded data as a serial bitstream on a data line 316 in accordance with timing provided in a clock signal transmitted on a clock line 318. A receiver processes the received serial bitstream using a serial-to-parallel convertor to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the RFFE bus 330.

Sequence Start Conditions on a Radio Frequency Front End Bus

Certain aspects disclosed herein relate to the signaling that is used to initiate transactions on an RFFE interface and on certain other types of interface. In the RFFE interface, and similar interfaces, a unique signaling combination is transmitted on two or more wires of a communication bus to indicate the start of a data transmission. In one example, the RFFE bus 330 is a two-wire serial bus and the unique signaling combination that indicates the start of data transmission is transmitted on clock and data lines of the serial bus.

Figure 4:
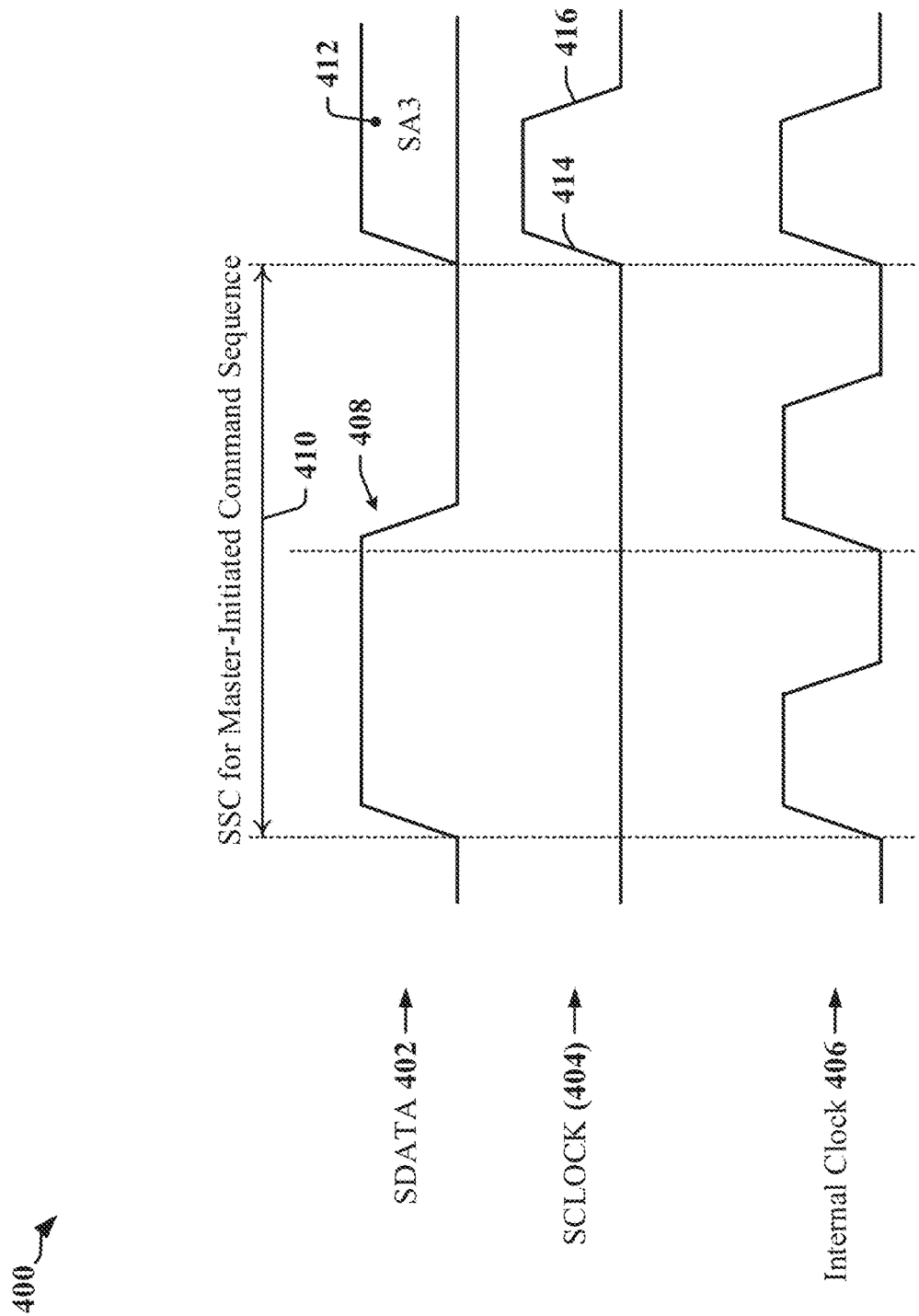
FIG. 4 illustrates a sequence start condition used in an RFFE interface.

FIG. 4 is a timing diagram 400 that illustrates a sequence start condition (SSC 410) used in an RFFE interface to indicate the start of a valid data-frame 412 that may include one or more information fields. The SSC 410 is defined by signaling on the data line (SDATA 402) and clock line (SCLOCK 404) that occurs within a time period on which the interface is otherwise idle. The SSC 410 in an RFFE interface is defined by a pulse 408 transmitted on SDATA 402 while SCLOCK 404 is held in a low logic state. Devices monitoring the RFFE bus are configured to ignore transmissions that are not preceded by an SSC 410.

An internal clock signal 406 that is used by a transmitting device to control transmission of the data-frame 412 may be provided on SCLOCK 404 while the data-frame 412 is transmitted. Edges 414 and/or 416 one SCLOCK 404 may be used to capture data transmitted on SDATA 402. In one mode of communication on the RFFE interface, data transmissions on SDATA 402 may be controlled by rising edges 414 on the SCLOCK 404. This mode of communication may be referred to as single data rate (SDR) mode of communication. Some implementations of the RFFE interface can support a double data rate (DDR) mode of communication, where data transmissions on SDATA 402 may be controlled by rising edges 414 and falling edges 416 on the SCLOCK 404.

Figure 5:
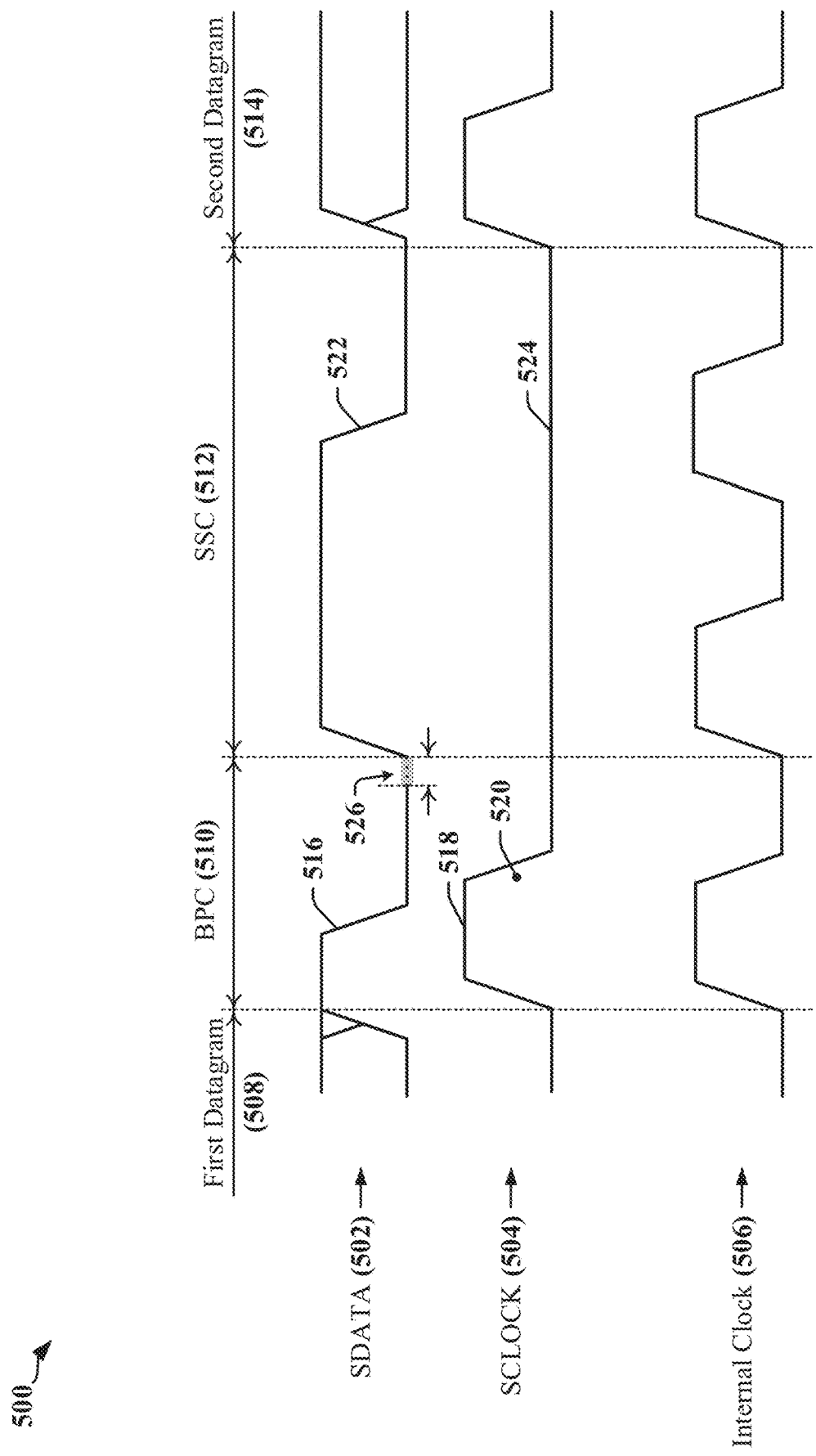
FIG. 5 illustrates signaling delineating sequentially transmitted datagrams in an RFFE interface.

FIG. 5 is a timing diagram that illustrates signaling 500 that can delineate sequentially transmitted datagrams 508, 514. In accordance with specifications governing the operation of RFFE interfaces, a bus park cycle (BPC 510) may be used to signal the end of transmission of the first datagram 508. The BPC 510 is signaled when a falling edge 516 on SDATA 502 occurs while SCLOCK 504 is in a high signaling state 518. As illustrated in the SSC 512 that precedes the second datagram 514, the SSC 512 includes a falling edge 522 on SDATA 502 that occurs while SCLOCK 504 is in a low signaling state 524. A bus owner master (BoM) transmits the BPC 510 and may transmit the SSC 512 to begin transmission of the second datagram 514. The BoM that transmitted the BPC 510 may determine that a second datagram 514 is not available for transmission and may release the RFFE bus after terminating the clock pulse 520 transmitted during the BPC 510. The BoM may release SDATA 502 while SDATA 502 is in a low signaling state by causing a line driver to enter a high-impedance state. SDATA 502 may be held in the low signaling state by a pull-down resistor for a period of time 526 until a BoM activates its line driver and actively drives SDATA 502.

In-Band Interrupt for RFFE

Figure 6:
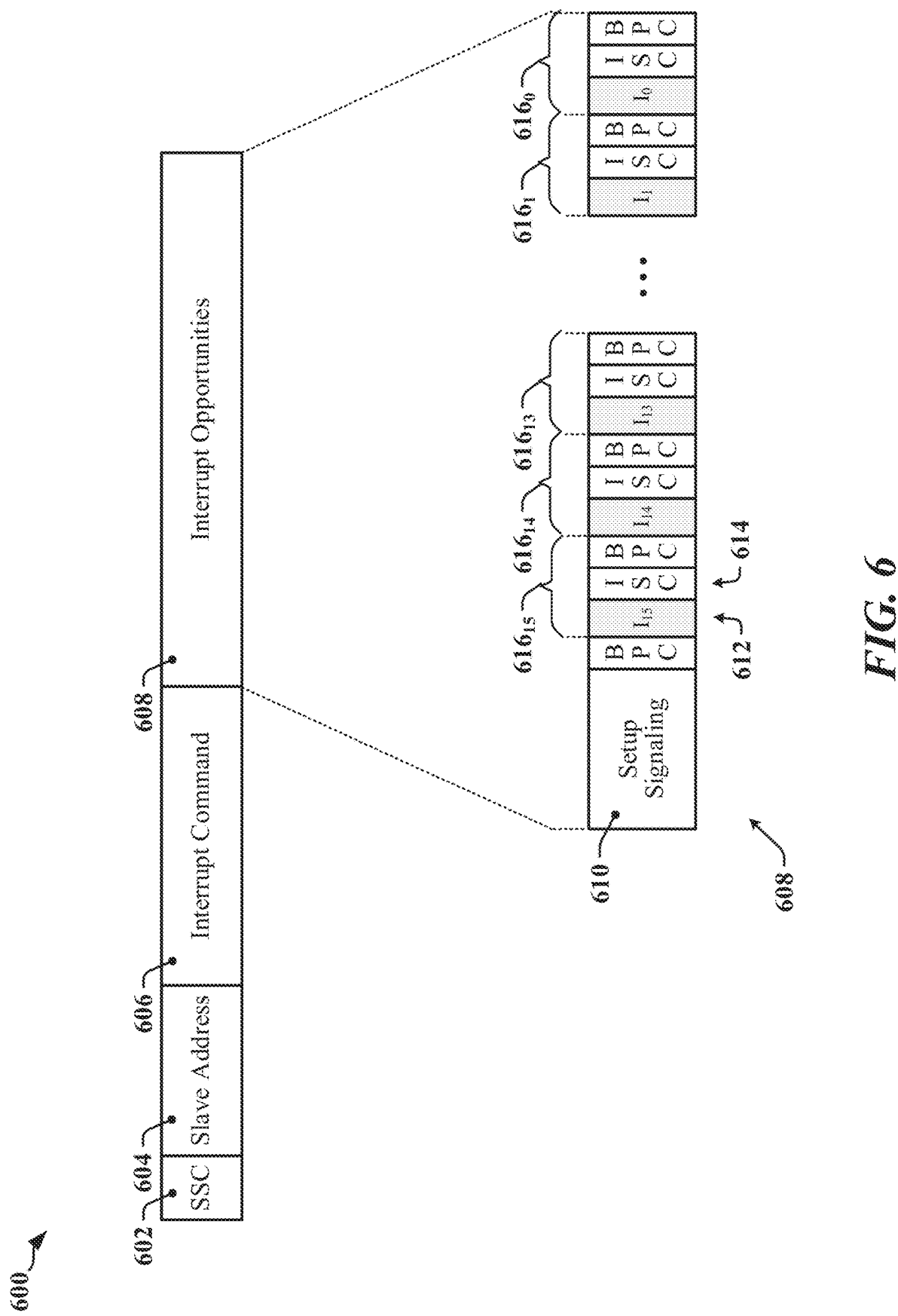
FIG. 6 illustrates an interrupt sequence identification datagram that may be transmitted on an RFFE bus.

In-band interrupts are supported by conventional RFFE architectures, where the BoM may determine, command and/or control when interrupts can be signaled. FIG. 6 illustrates an example of interrupt sequence identification datagram 600 that may be transmitted to provide in-band interrupt capability for an RFFE bus. An SSC 602 transmitted by the BoM precedes a transaction that includes transmission by the BoM of a slave address field 604 and a command field 608. The command field 608 includes a command code recognized by other devices coupled to the RFFE bus as being interrupt-related. For example, the command code may correspond to an Interrupt Summary and Identification command defined by RFFE protocols. Any device may signal a pending interrupt by driving SDATA during a period $616_{15}$-$616_0$ corresponding to the address of the asserting device. In some implementations, setup signaling 610 may be provided by the BoM before the first BPC transmission. Each period $616_{15}$-$616_0$ is bounded by BPC transmissions and includes an interrupt slot 612 during which SDATA may be driven to the high signaling state in order to assert an interrupt followed by Interrupt Slot Close signaling 614.

Conventional interrupt mechanisms defined for RFFE do not support interrupts initiated by a device other than the BoM. Slave devices and/or secondary master devices are limited to signaling interrupts in response to an interrupt command 606 transmitted by the BoM, which is typically transmitted periodically by a BoM configured to poll for interrupts. BoM-initiated interrupt polling can introduce unacceptable latency and/or can substantially impact system level power. For example, polling intervals may prevent guaranteed detection of critical interrupts within a specified or desired time, with a potential for system failure as a result. For these and other reasons, some applications for RFFE interfaces demand asynchronous interrupt capability that is not supported by conventional RFFE protocols.

Certain aspects disclosed herein provide an architecture and techniques that provide asynchronous and/or synchronous in-band interrupt capability for an RFFE bus. In some instances, the mode can be selected by register configuration. An asynchronous in-band interrupt may be asserted when one or more devices drive SDATA while SDATA is idle. As illustrated in FIG. 5, for example, SDATA 502 may be held in the low signaling state by a pull-down resistor for a period of time 526 until a BoM activates its line driver and actively drives SDATA 502. SDATA 502 may be in resistor pull-down mode for a relatively short period of time 526 when the BoM has a datagram 514 for immediate transmission after the BPC 510. Certain aspects disclosed herein enable the BoM to inhibit in-band interrupt assertion and to provide a defined period of time to allow assertion of in-band interrupts when assertion of in-band interrupt is not inhibited, thereby avoiding possible contention with signals driven by the BoM on SDATA 502.

Figure 7:
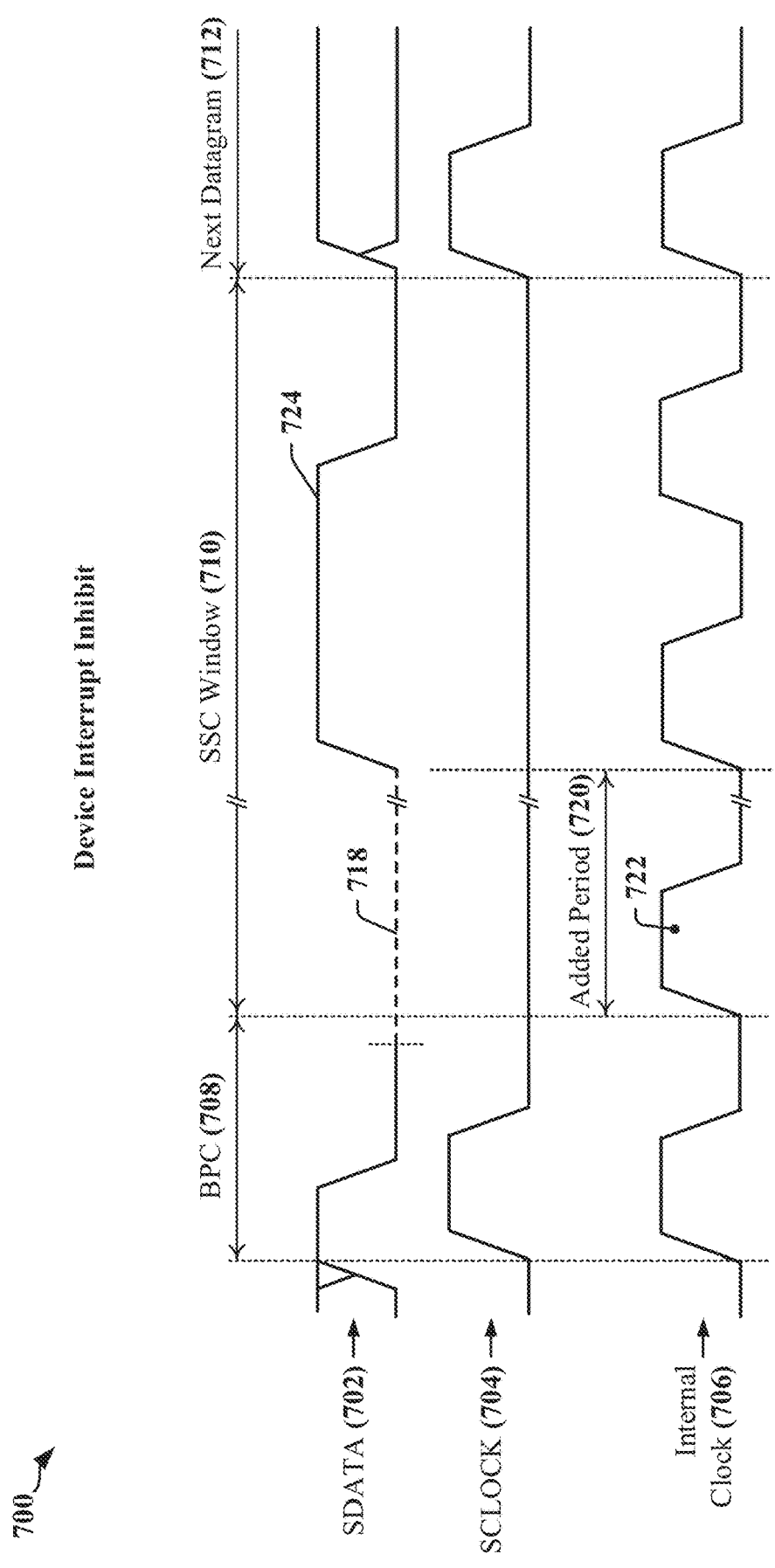
FIG. 7 illustrates an example of signaling that may be transmitted to inhibit in-band interrupts in accordance with certain aspects disclosed herein.

FIG. 7 illustrates an example of signaling 700 that may be transmitted when the BoM inhibits in-band interrupts in accordance with certain aspects disclosed herein. With respect to the signaling 500 illustrated in FIG. 5, asynchronous in-band interrupt capability can be facilitated by driving SDATA 702 to a low signaling state 718 and maintaining the low signaling state 718 for at least one clock period 720 during which interrupts may be asserted. Asynchronous in-band interrupts may be inhibited when the BoM transmits an SSC 710 that includes an additional one clock period 720. A corresponding clock pulse 722 in an internal clock signal 706 used to generate the clock signal transmitted on SCLOCK 704 is suppressed in SCLOCK 704. Devices that have pending interrupts may be configured to assert the interrupts asynchronously when the clock pulse 722 in the internal clock signal 706 is expressed in the clock signal transmitted on SCLOCK 704. When no clock pulse is transmitted on SCLOCK 704 after the BPC 708 and before SDATA 702 transitions to the high signaling state 724 as part of conventional SSC 710 signaling, in-band interrupts are suppressed and the BoM may continue transmitting a pending datagram 712.

Figure 8:
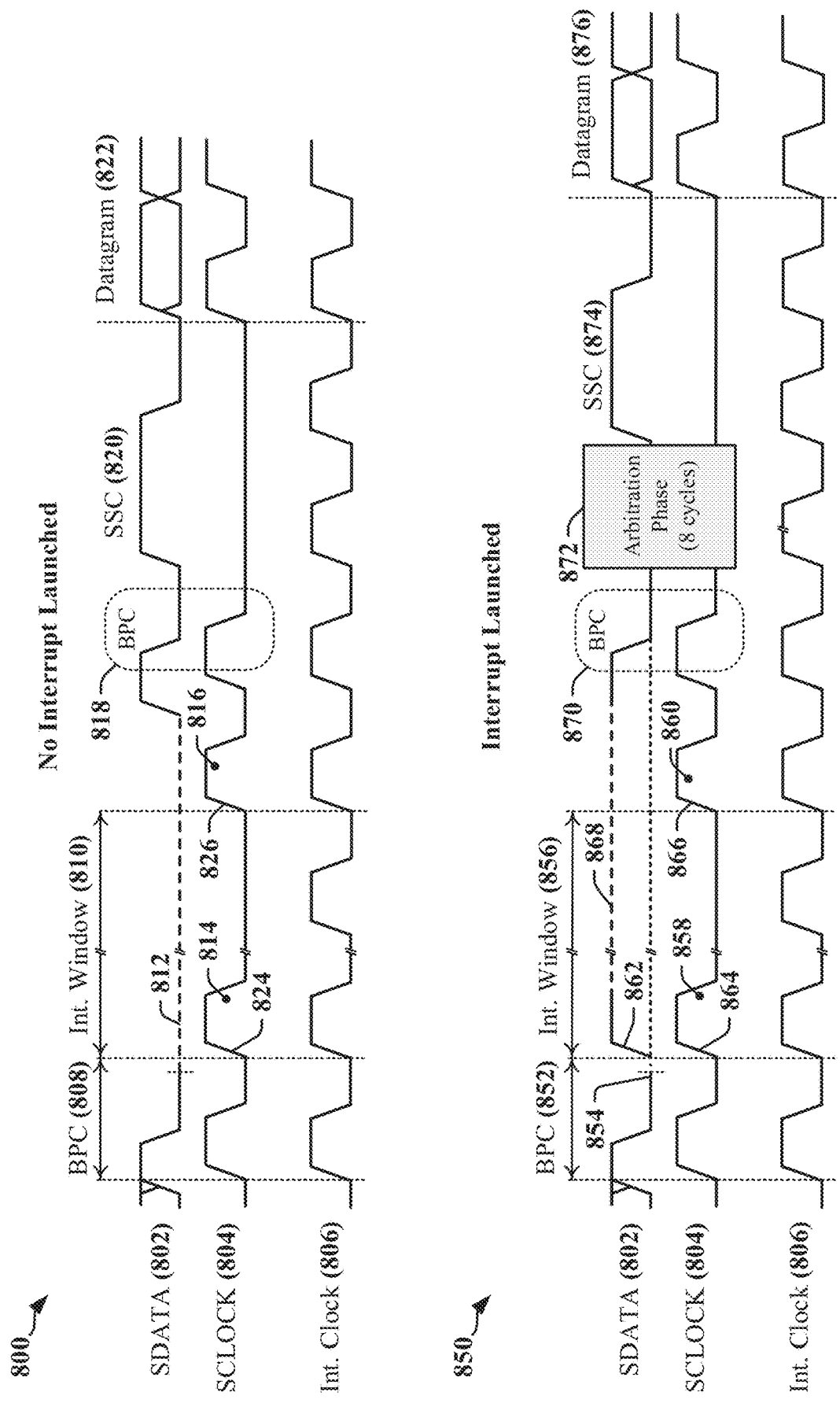
FIG. 8 illustrates first examples of signaling that may be transmitted when a first mode of in-band interrupts is provided in accordance with certain aspects disclosed herein.

FIG. 8 illustrates first examples of signaling 800, 850 that may be transmitted when a first mode of in-band interrupts is provided in accordance with certain aspects disclosed herein. The first signaling 800 in FIG. 8 relates to an example in which in-band interrupts are enabled when no device has a pending interrupt to assert. A BoM coupled to a serial bus may be configured to monitor the bus for asynchronous in-band interrupts during an interrupt window 810. In one example, the BoM drives SDATA 802 to a low signaling state 812 after a BPC 808, and then disables the BoM line driver coupled to SDATA 802. SDATA 802 may be maintained in the low signaling state 812 by a resistive pull-down or keeper circuit for the duration of the interrupt window 810. In one example, the interrupt window 810 has a duration of at least one clock period. A first clock pulse 814 is provided on SCLOCK 804 to indicate the start of the interrupt window 810, and a second clock pulse 816 is transmitted on SCLOCK 804 to terminate the interrupt window 810. A BPC 818 is transmitted after the interrupt window 810 and before the SSC 820 that precedes the next datagram 822. In this example, devices that have pending interrupts may be configured to assert the interrupts beginning with the rising edge 824 of the clock pulse 814 marking the start of the interrupt window 810 and the rising edge 826 of the clock pulse 816 terminating the interrupt window 810. In this example, no interrupts are asserted.

The second signaling 850 in FIG. 8 relates to an example in which in-band interrupts are enabled and at least one device has a pending interrupt to assert. A BoM coupled to a serial bus may be configured to monitor the bus for asynchronous in-band interrupts during an interrupt window 856. In one example, the BoM drives SDATA 802 to a low signaling state 854 after a BPC 852, and then disables the BoM line driver coupled to SDATA 802. SDATA 802 may be maintained in the low signaling state 854 by a resistive pull-down or keeper circuit for the duration of the interrupt window 856. In one example, the interrupt window 856 has a duration of at least one clock period. A first clock pulse 858 is provided on SCLOCK 804 to indicate the start of the interrupt window 856, and a second clock pulse 860 is transmitted on SCLOCK 804 to terminate the interrupt window 856. A BPC 870 is transmitted after the interrupt window 856. In this example, one or more devices that have pending interrupts may assert the interrupts by actively driving SDATA 802, causing a transition (rising edge 862) in the high voltage state on SDATA 802. A device with an active line driver can typically overcome the effect of a pull-down resistance or keeper circuit. The device asserting the interrupt may disable its line driver after driving SDATA 802 to the high signaling state. SDATA 802 may be maintained by resistive pull-up or a keeper circuit in the high signaling state 868. The rising edge 862 on SDATA 802 may occur between the rising edge 864 of the first clock pulse 858 marking the start of the interrupt window 856 and the rising edge 866 of the second clock pulse 860 that terminates the interrupt window 856. In this example, at least one interrupt is asserted and the BoM may initiate a bus arbitration phase 872 to determine the source or sources of the interrupts. An SSC 874 may be transmitted to start transmission of the next datagram 876. Upon detection of an interrupt the BoM may optionally initiate an interrupt sequence identification datagram 600 in place of an arbitration-phase.

Figure 9:
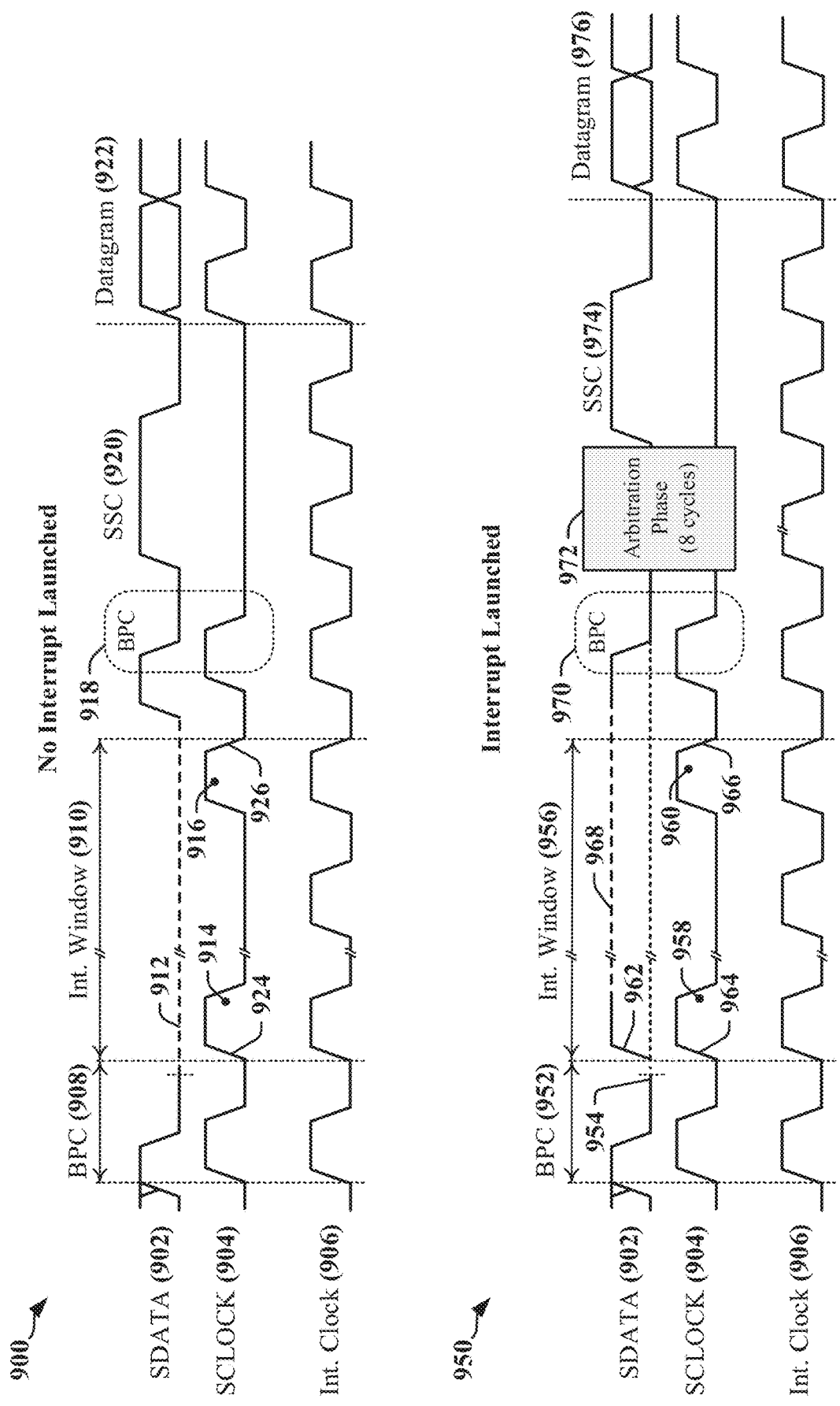
FIG. 9 illustrates second examples of signaling that may be transmitted when the first mode of in-band interrupts is provided in accordance with certain aspects disclosed herein.

FIG. 9 illustrates second examples of signaling 900, 950 that may be transmitted when the first mode of in-band interrupts is provided in accordance with certain aspects disclosed herein. The interrupt window 910, 956 illustrated in FIG. 9 is extended with respect to the corresponding interrupt window 810, 856 illustrated in FIG. 8, and the interrupt window 910, 956 includes the duration of the clock pulse 916, 960 that terminates the interrupt window 910, 956. The first signaling 900 in FIG. 9 relates to an example where in-band interrupts are enabled, and no device has a pending interrupt to assert. A BoM coupled to a serial bus may be configured to monitor the bus for asynchronous in-band interrupts during an interrupt window 910. In one example, the BoM drives SDATA 902 to a low signaling state 912 after a BPC 908, and then disables the BoM line driver coupled to SDATA 902. SDATA 902 may be maintained in the low signaling state 912 by a resistive pull-down or keeper circuit for the duration of the interrupt window 910. In one example, the interrupt window 910 has a duration of at least one clock period. A first clock pulse 914 is provided on SCLOCK 904 to indicate the start of the interrupt window 910, and a second clock pulse 916 is transmitted on SCLOCK 904 to terminate the interrupt window 910. A BPC 918 is transmitted after the interrupt window 910 and before the SSC 920 that precedes the next datagram 922. In this example, devices that have pending interrupts may be configured to assert the interrupts beginning with the rising edge 924 of the first clock pulse 914 marking the start of the interrupt window 910 and the falling edge 926 of the second clock pulse 916 terminating the interrupt window 910. In this example, no interrupts are asserted.

The second signaling 950 in FIG. 9 relates to an example where in-band interrupts are enabled and at least one device has a pending interrupt to assert. A BoM coupled to a serial bus may be configured to monitor the bus for asynchronous in-band interrupts during an interrupt window 956. In one example, the BoM drives SDATA 902 to a low signaling state 954 after a BPC 952, and then disables the BoM line driver coupled to SDATA 902. SDATA 902 may be maintained in the low signaling state 954 by a resistive pull-down or keeper circuit for the duration of the interrupt window 956. In one example, the interrupt window 956 has a duration of at least one clock period. A first clock pulse 958 is provided on SCLOCK 904 to indicate the start of the interrupt window 956, and a second clock pulse 960 is transmitted on SCLOCK 904 to terminate the interrupt window 956. A BPC 970 is transmitted after the interrupt window 956. In this example, one or more devices that have pending interrupts may assert the interrupts by actively driving SDATA 902 to cause a transition or edge 962 in signaling state on SDATA 902 to the high voltage state. A device with an active line driver can typically overcome the effect of a pull-down resistance or keeper circuit. The device asserting the interrupt may disable its line driver after driving SDATA 902 to the high signaling state. SDATA 902 may be maintained by resistive pull-up or a keeper circuit in the high signaling state 968. The rising edge 962 on SDATA 902 may occur between the rising edge 964 of the first clock pulse 958 marking the start of the interrupt window 956 and the falling edge 966 of the second clock pulse 960 that terminates the interrupt window 956. In this example, at least one interrupt is asserted and the BoM may initiate a bus arbitration phase 972 to determine the source or sources of the interrupts. An SSC 974 may be transmitted to start transmission of the next datagram 976.

Upon detection of an interrupt the BoM may optionally initiate an interrupt sequence identification datagram 600 in place of an arbitration-phase. The mode of identifying a source of an interrupt may be configured by one or more register settings. In the examples illustrated in FIG. 9, devices asserting interrupts may be required to have an on-chip oscillator or receive a common low frequency clock signal to provide timing that controls the launch of asynchronous interrupts.

Figure 10:
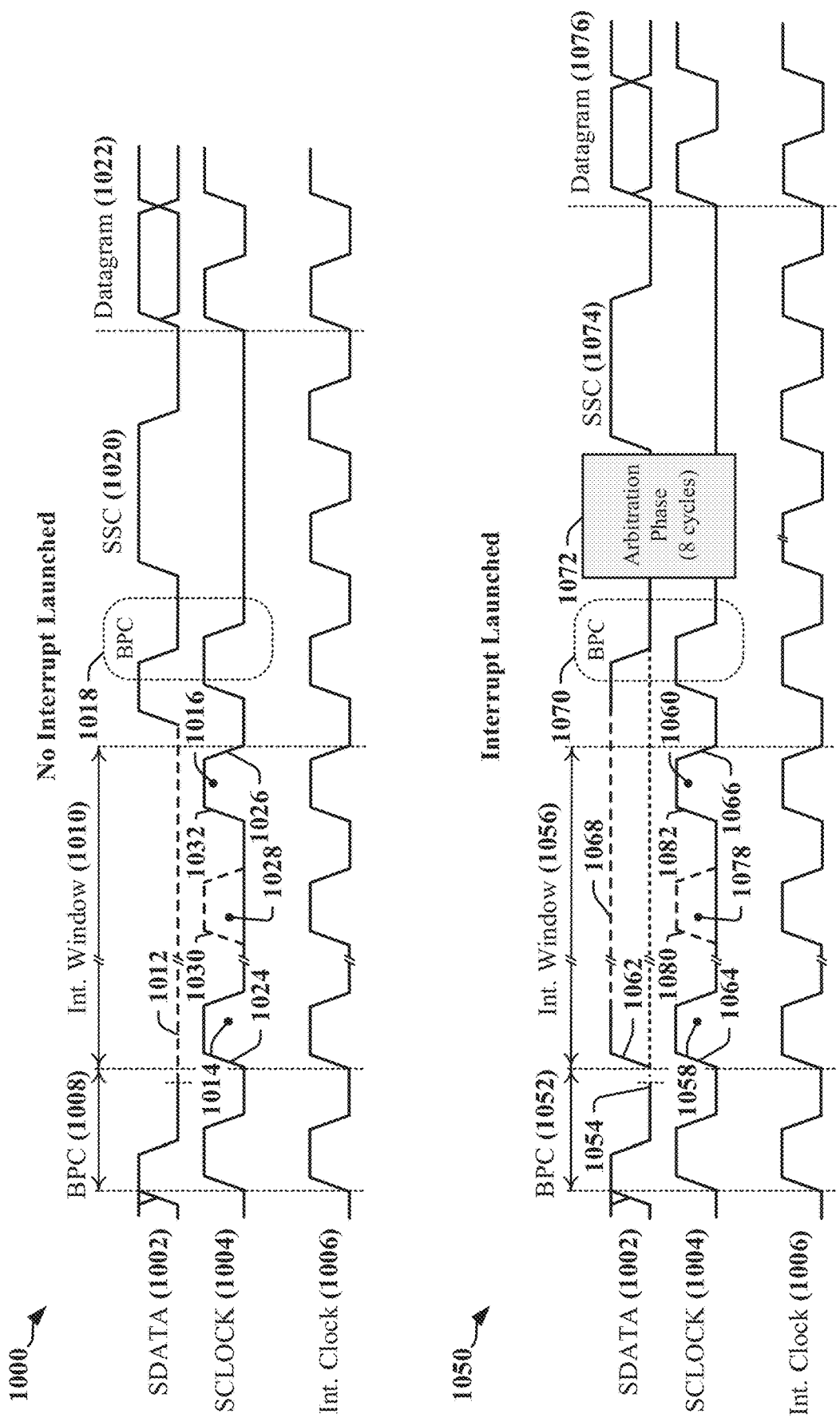
FIG. 10 illustrates first examples of signaling that may be transmitted when a second mode of in-band interrupts is provided in accordance with certain aspects disclosed herein.

FIG. 10 illustrates first examples of signaling 1000, 1050 that may be transmitted when a second mode of in-band interrupts is provided in accordance with certain aspects disclosed herein. Synchronous in-band interrupts may be supported when devices asserting interrupts do not have an on-chip oscillator, and do not receive a clock signal suitable for timing launch of interrupts. Additional clock pulses 1028, 1078 may be transmitted on SCLOCK 1004 to enable certain devices to time the launch of interrupts within an interrupt window 1010, 1056. The first signaling 1000 in FIG. 10 relates to an example where in-band interrupts are enabled, and no device has a pending interrupt to assert. Synchronous in-band interrupt capability is permitted after SDATA 1002 is driven to a low signaling state 1012 after a BPC 1008 transmitted by a BoM, which may then disable its line driver coupled to SDATA 1002. SDATA 1002 may be maintained in the low signaling state 1012 by a resistive pull-down or keeper circuit for at least one clock period to provide an interrupt window 1010 during which interrupts may be asserted. A first clock pulse 1014 is provided on SCLOCK 1004 to indicate the start of the interrupt window 1010, and a second clock pulse 1016 is transmitted on SCLOCK 1004 to terminate the interrupt window 1010. One or more additional clock pulses 1028 may be transmitted while the interrupt window 1010 is open. A BPC 1018 is transmitted after termination of the interrupt window 1010 and before the SSC 1020 that precedes the next datagram 1022. In this example, devices that have pending interrupts may be configured to assert the interrupts at the occurrence of a rising edge 1024, 1030, 1032 of the clock pulses 1014, 1016, 1028. In this example, no interrupts are asserted.

The second signaling 1050 in FIG. 10 relates to an example where in-band interrupts are enabled and at least one device has a pending interrupt to assert. The second signaling 1050 relates to an example where in-band interrupts are enabled and one or more devices have a pending interrupt to assert. Synchronous in-band interrupt capability is permitted after SDATA 1002 is driven to a low signaling state 1012 after a BPC 1052 transmitted by a BoM, which may then disable its line driver coupled to SDATA 1002. SDATA 1002 may be maintained in the low signaling state 1054 by a resistive pull-down or keeper circuit for at least one clock period to provide an interrupt window 1056 during which interrupts may be asserted. A first clock pulse 1058 is provided on SCLOCK 1004 to indicate the start of the interrupt window 1056, and a second clock pulse 1060 is transmitted on SCLOCK 1004 to terminate the interrupt window 1056. One or more additional clock pulses 1078 may be transmitted while the interrupt window 1056 is open. A BPC 1070 is transmitted after termination of the interrupt window 1056. In this example, one or more devices that have pending interrupts may assert the interrupts by actively driving SDATA 1002 to cause a transition on SDATA 1002 to the high voltage state. A device with an active line driver can typically overcome the effect of a pull-down resistance or keeper circuit. The device asserting the interrupt may disable its line driver after driving SDATA 1002 to the high signaling state. SDATA 1002 may be maintained by resistive pull-up or a keeper circuit in the high signaling state 1068. Devices that have pending interrupts may be configured to assert the interrupts at the occurrence of a rising edge 1064, 1080, 1082 of the clock pulses 1058, 1060, 1078. In this example, at least one interrupt is asserted and the BoM may initiate a bus arbitration phase 1072 to determine the source or sources of the interrupts. An SSC 1074 may be transmitted to start transmission of the next datagram 1076.

Upon detection of an interrupt the BoM may optionally initiate an interrupt sequence identification datagram 600 in place of an arbitration-phase. The mode of identifying a source of an interrupt may be configured by one or more register settings. In the examples illustrated in FIG. 10, devices asserting interrupts may be required to have an on-chip oscillator or receive a common low frequency clock signal to provide timing that controls the launch of asynchronous interrupts. The provision of additional pulses 1028, 1078 in the interrupt window 1010, 1056 can increase power consumption of the RFFE interface. The BoM may be configurable to transmit any desired number and/or pattern of additional pulses 1028, 1078 in the interrupt window 1010, 1056.

Figure 11:
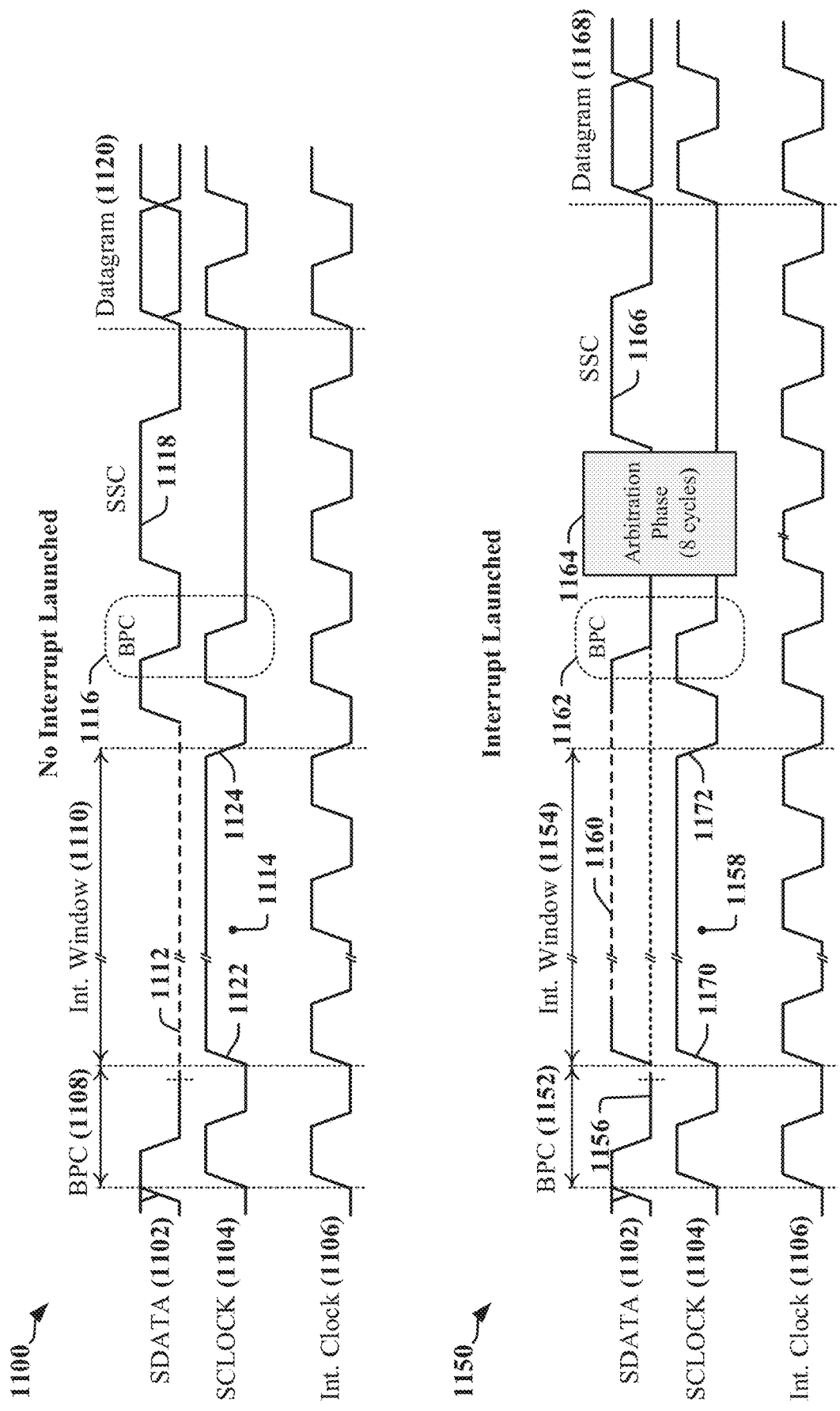
FIG. 11 illustrates examples of signaling that may be transmitted when a third mode of in-band interrupts is provided in accordance with certain aspects disclosed herein.

FIG. 11 illustrates examples of signaling 1100, 1150 that may be transmitted when a third mode of in-band interrupts is provided in accordance with certain aspects disclosed herein. In the third mode, asynchronous interrupts are permitted when a clock pulse is present on SDATA 1102, where the interrupt-enabling clock pulse may be elongated with respect to other clock pulses transmitted on SDATA 1102 during datagram transmission. The first signaling 1100 in FIG. 11 relates to an example where in-band interrupts are enabled, and no device has a pending interrupt to assert. Asynchronous in-band interrupt capability can be facilitated by driving SDATA 1102 to a low signaling state after a BPC 1108, before disabling the BoM line driver coupled to SDATA 1102. SDATA 1102 may be maintained in the low signaling state 1112 by a resistive pull-down or keeper circuit for the duration of an interrupt window 1110 during which interrupts may be asserted. A clock pulse 1114 is provided on SCLOCK 1104 to indicate the interrupt window 1110, where a rising edge 1122 of the clock pulse 1114 corresponds to the opening of the interrupt window 1110, and a falling edge 1124 of the clock pulse 1114 terminates the interrupt window 1110. A BPC 1116 is transmitted after the interrupt window 1110 and before the SSC 1118 that precedes the next datagram 1120. In this example, devices that have pending interrupts may be configured to assert the interrupts beginning with the rising edge 1122 of the clock pulse 1114 and the falling edge 1124 of the clock pulse 1114. In this example, no interrupts are asserted.

The second signaling 1150 in FIG. 11 relates to an example where in-band interrupts are enabled and at least one device has a pending interrupt to assert. Asynchronous in-band interrupt capability can be facilitated by driving SDATA 1102 to a low signaling state 1156 after a BPC 1152, before disabling the BoM line driver coupled to SDATA 1102. SDATA 1102 can be maintained in the low signaling state 1156 by a resistive pull-down or keeper circuit for at least one clock period to provide an interrupt window 1154 during which interrupts may be asserted. A stretched or elongated clock pulse 1158 is provided on SCLOCK 1104 to indicate the availability of the interrupt window 1154. A BPC 1162 is transmitted after the interrupt window 1154. In this example, one or more devices that have pending interrupts may assert the interrupts by actively driving SDATA 1102, causing a transition to the high voltage state on SDATA 1102. A device with an active line driver can typically overcome the effect of a pull-down resistance or keeper circuit. The device asserting the interrupt may disable its line driver after driving SDATA 1102 to the high signaling state. SDATA 1102 may be maintained by resistive pull-up or a keeper circuit in the high signaling state 1160. The rising edge on SDATA 1102 may occur between the rising edge 1170 of the clock pulse and the falling edge 1172 of the clock pulse 1158, which terminates the interrupt window 1154. In this example, at least one interrupt is asserted and the BoM may initiate a bus arbitration phase 1164 to determine the source or sources of the interrupts. An SSC 1166 may be transmitted to start transmission of the next datagram 1168. Upon detection of an interrupt the BoM may optionally initiate an interrupt sequence identification datagram 600 in place of an arbitration-phase.

In some instances, the bus arbitration phase 872, 972, 1072, 1164 may be initiated immediately after closure of an interrupt window 856, 956, 1056, 1154. The bus arbitration phase 872, 972, 1072, 1164 may be based on slave address, where the value of the slave address determines a priority level for the associated device. In some implementations, the lowest slave address is allocated to a device that generates highest-priority interrupts. In other implementations, the highest slave address is allocated to a device that generates highest-priority interrupts. In various examples, the BoM may transmit signaling indicating that bus arbitration is in progress. Each device that has asserted an interrupt may transmit its slave address, most significant bit first, on SDATA in accordance with a clock signal provided on SCLOCK.

In the example where highest address is associated with highest priority, SDATA may be pulled to the low signaling state. Devices participating in the arbitration may be configured to drive SDATA high and refrain from pulling SDATA low. The participating device with the highest address wins the arbitration when other devices observe a high level on SDATA corresponding to an address bit in their slave addresses that has a zero value.

In the example where lowest address is associated with highest priority, SDATA may be pulled to the high signaling state. Devices participating in the arbitration may be configured to pull SDATA low and refrain from driving SDATA high. The participating device with the lowest address wins the arbitration when other devices observe a low level on SDATA corresponding to an address bit in their slave addresses that has a non-zero value.

Figure 12:
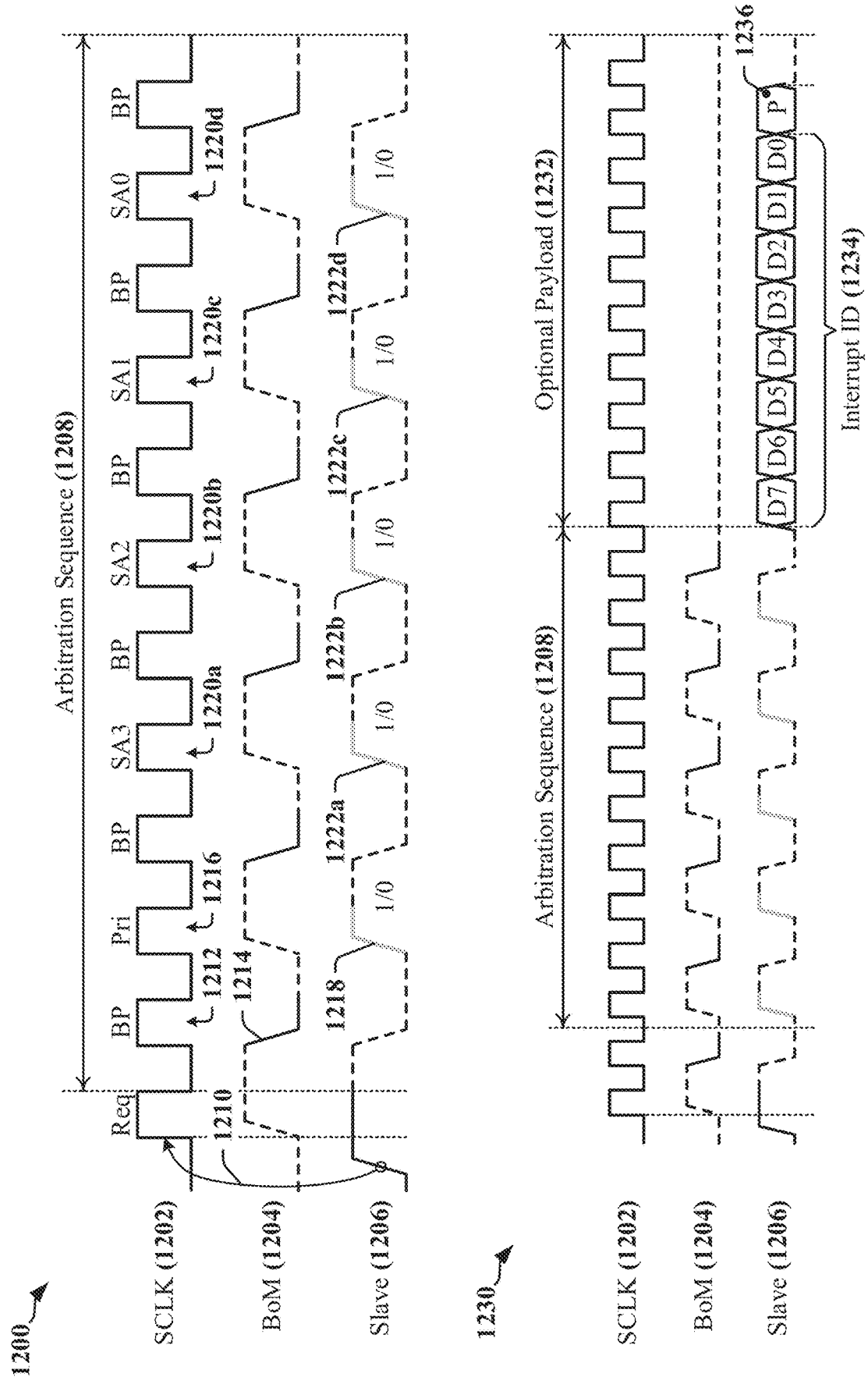
FIG. 12 illustrates an arbitration processes that may be implemented in accordance with certain aspects disclosed herein.

FIG. 12 includes timing diagrams 1200, 1230 that illustrate arbitration processes that may be implemented in accordance with certain aspects disclosed herein. Each timing diagram 1200, 1230 includes an arbitration sequence 1208 that may be triggered by an assertion of an in-band interrupt 1210. Each timing diagram illustrates the clock signal transmitted on SCLK 1202 and the contributions 1204, 1206 to signaling state on SDATA by the BoM and one or more slave devices, respectively. The output of the line driver of the BoM that is coupled to SDATA is in a high impedance state when the in-band interrupt 1210 is asserted. The BoM enables the line driver and drives SDATA low when transmitting the first clock pulse 1212 of the arbitration sequence 1208 to generate bus park signaling. The combination of the in-band interrupt 1210 and the arbitration sequence 1208 includes a total of 12 clock cycles, where bus park signaling is transmitted using one clock pulse of each of 6 pairs of clock pulses. A slave device can drive SDATA high 1218, 1222*a*, 1222*b*, 1222*c*, 1222*d* during in the odd cycles as needed to signal a priority bit and/or slave address bits during odd clock pulses 1216, 1220*a*, 1220*b*, 1220*c*, 1220*d*. The slave device is configured to drive SDATA for the first half of a clock cycle. The BoM drives the SDATA for the first half of every even cycle.

After assertion of the in-band interrupt 1210, the arbitration sequence 1208 provides for transmission of a priority bit and four slave ID bits. Priority assigned to slave devices is signified by the slave identifiers. The highest priority device has the highest value slave identifier. An interrupt-requesting slave device with the highest priority drives SDATA high earlier more often than other devices requesting interrupt servicing. The slave device with the highest-value slave identifier has the highest priority and wins the arbitration process.

As illustrated in the second timing diagram 1230, the slave device may be configured to transmit an optional payload 1232 after the arbitration sequence 1208. In one example, the payload 1232 may carry an 8-bit interrupt identifier 1234 and one bit of data in the payload 1236 followed by a bus park condition.

The demand for increased throughput and/or reduced bus latency can be expected to result in the use of clock signals on SCLK 1202 that have continually increasing maximum clock frequencies. Increased clock frequencies may affect or inhibit the arbitration processes disclosed herein. In one example, resistive pull-downs may limit signal transition times when line drivers coupled to SDATA are configured for high impedance mode. In another example, one or more line drivers coupled to SDATA may have limited capability with regard to driving wires that have resistive terminations.

Figure 13:
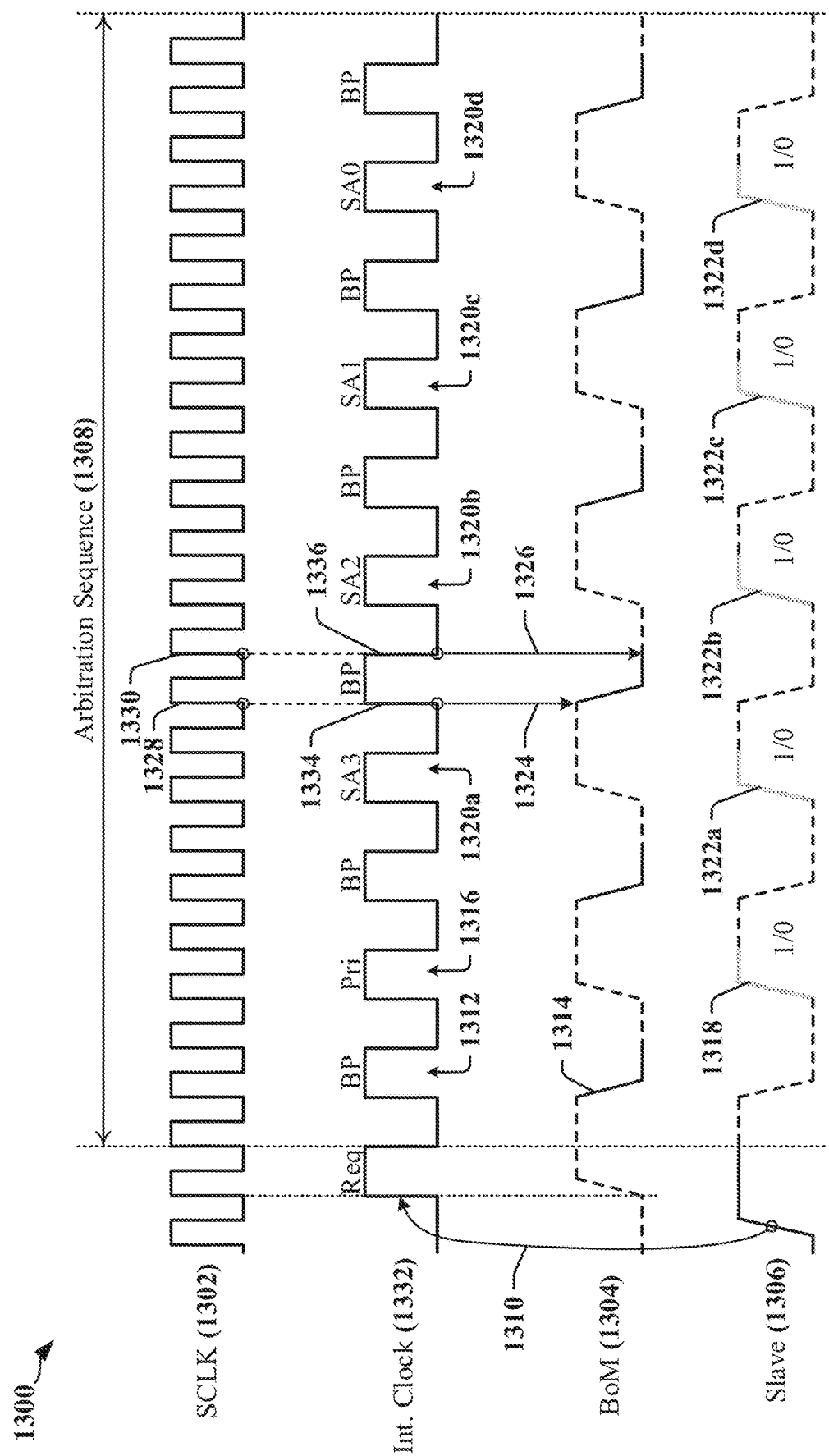
FIG. 13 includes a timing diagram that illustrates a modified arbitration process that may be implemented in accordance with certain aspects disclosed.

FIG. 13 includes a timing diagram 1300 that illustrates a modified arbitration process that may be implemented in accordance with certain aspects disclosed herein when clock signal frequency is increased to the point that rise times prevent signaling that transitions on the half-cycle of the clock signal. In one example, the arbitration processes disclosed in relation to FIG. 12 may operate effectively when the clock signal has a clock frequency of 26 MHz but may become ineffective at 52 MHz or higher. These FIG. 12 arbitration processes may first become inoperable at frequencies less than 52 MHz in some configurations of the serial bus and/or line drivers coupled to the serial bus, or at frequencies greater than 52 MHz in other configurations of the serial bus and/or line drivers coupled to the serial bus.

The timing diagram 1300 includes an arbitration sequence 1308 that may be triggered by an assertion of an in-band interrupt 1310. The timing diagram 1300 illustrates the clock signal transmitted on SCLK 1302 and the contributions 1304, 1306 to signaling state on SDATA by the BoM and one or more slave devices, respectively. An internal clock signal 1332 may be used to control timing of the arbitration sequence 1308 when the frequency of the clock signal transmitted on SCLK 1302 exceeds a maximum frequency defined for various configurations of the serial bus and/or line drivers coupled to the serial bus. In some instances, the maximum frequency may be defined based on minimum transition and/or hold times for a slowest line driver coupled to the serial bus. The frequency may be defined based on a power budget or another design goal.

In one example, frequency of the clock signal transmitted on SCLK 1302 may be 52 MHz and the defined maximum frequency may lie between 26 MHz and 52 MHz. In this latter example, an internal clock signal 1332 with a lower frequency may be used to control timing of the arbitration sequence 1308. In the illustrated example, the clock signal transmitted on SCLK 1302 has a frequency that is double the frequency of the internal clock signal 1332. This combination of frequencies permits the implementation of the arbitration sequence 1308 using relatively simple circuits. Other combinations of frequencies may be used.

In the illustrated example, each phase in the arbitration sequence 1308 corresponds to a full cycle of the clock signal transmitted on SCLK 1302 and a half cycle of the internal clock signal 1332. Accordingly, each transition in signaling state on the SDATA signal and/or change in drive mode of line drivers is timed to the same type of edge in the clock signal transmitted on SCLK 1302. For example, the BoM may initiate 1324 an active driving mode of its SDATA line driver at a first rising edge 1328 the clock signal transmitted on SCLK 1302 and may terminate 1326 the active driving mode at a second rising edge 1330. The rising edges 1328 and 1330 in the clock signal transmitted on SCLK 1302 correspond to transitions 1334, 1336 in different directions on the internal clock signal 1332.

The output of the line driver of the BoM that is coupled to SDATA is in a high impedance state when the in-band interrupt 1310 is asserted. The BoM enables the line driver and drives SDATA low when transmitting a first clock pulse 1312 arbitration sequence 1308 to generate bus park signaling. The combination of the in-band interrupt 1310 and the arbitration sequence 1308 includes a total of 12 clock cycles of the internal clock signal 1332, where bus park signaling is transmitted using one clock pulse of each of 6 pairs of clock pulses. A slave device can drive SDATA high 1318, 1322a, 1322b, 1322c, 1322d during odd cycles of the internal clock signal 1332 as needed to signal a priority bit and/or slave address bits during odd clock pulses 1316, 1320a, 1320b, 1320c, 1320d. The slave device is configured to drive SDATA for the first half of a clock cycle of the internal clock signal 1332. The BoM drives the SDATA for the first half of every even cycle of the internal clock signal 1332.

After assertion of the in-band interrupt 1310, the arbitration sequence 1308 provides for transmission of a priority bit and four slave ID bits. Priority assigned to slave devices is signified by the slave identifiers. The highest priority device has the highest value slave identifier. An interrupt-requesting slave device with the highest priority drives SDATA high earlier more often than other devices requesting interrupt servicing. The slave device with the highest-value slave identifier has the highest priority and wins the arbitration process.

Figure 14:
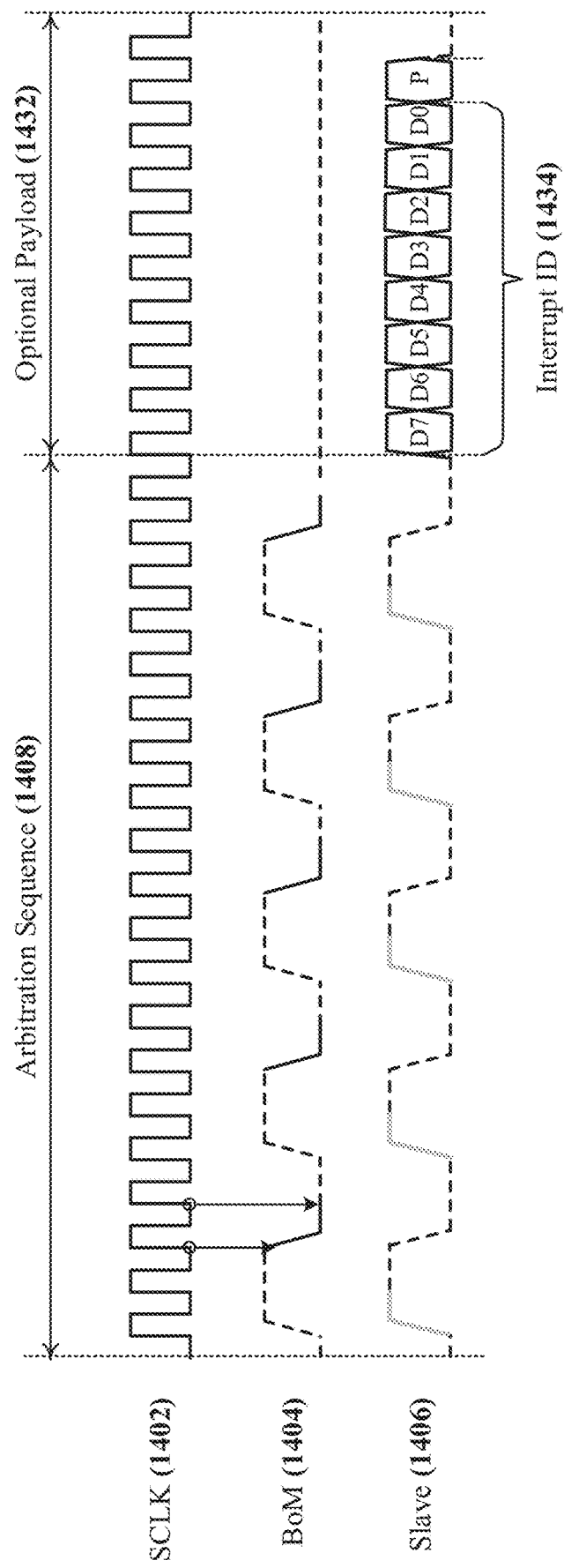
FIG. 14 includes a timing diagram that illustrates certain aspects of the modified arbitration process illustrated in FIG. 13.

FIG. 14 includes a timing diagram 1400 that illustrates another example of a modified arbitration process. The timing diagram illustrates contributions 1404, 1406 of the BoM and a slave device, respectively, when an optional payload 1432 is transmitted during the modified arbitration process illustrated in FIG. 13. The slave device may be configured to transmit the optional payload 1432 after the arbitration sequence 1408, while the BoM continues to transmit a clock signal on SCLK 1402. In one example, the payload 1432 may carry an 8-bit interrupt identifier 1434 and one or more bits of data in the payload 1432 followed by a bus park condition. The payload 1432 is transmitted in accordance with the clock signal transmitted on SCLK 1402 while timing for the arbitration sequence 1408 is provided by a slower internal clock signal. In some examples, the internal clock signal has a frequency that is half the frequency of the clock signal transmitted on SCLK 1402.

Examples of Processing Circuits and Methods

Figure 15:
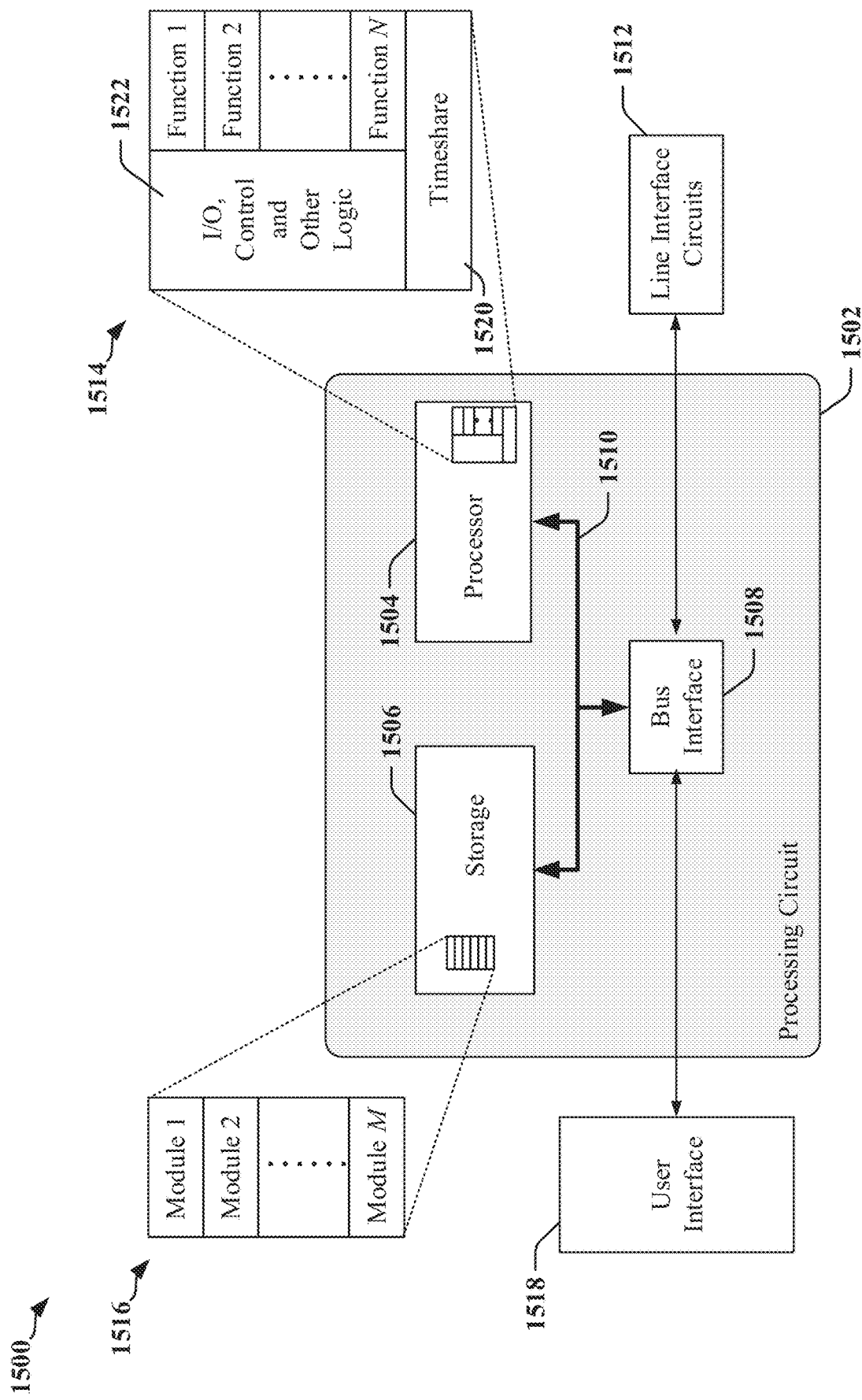
FIG. 15 is a block diagram illustrating an example of an apparatus employing a processing circuit that may be adapted according to certain aspects disclosed herein.

FIG. 15 is a conceptual diagram illustrating a simplified example of a hardware implementation for an apparatus 1500 employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a processor-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external processor-readable medium. The external processor-readable medium and/or storage 1506 may include a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable medium and/or storage 1506 may also include, by way of example, a carrier wave, a transmission line, and any other suitable medium for transmitting software and/or instructions that may be accessed and read by a computer. Processor-readable medium and/or the storage 1506 may reside in the processing circuit 1502, in the processor 1504, external to the processing circuit 1502, or be distributed across multiple entities including the processing circuit 1502. The processor-readable medium and/or storage 1506 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
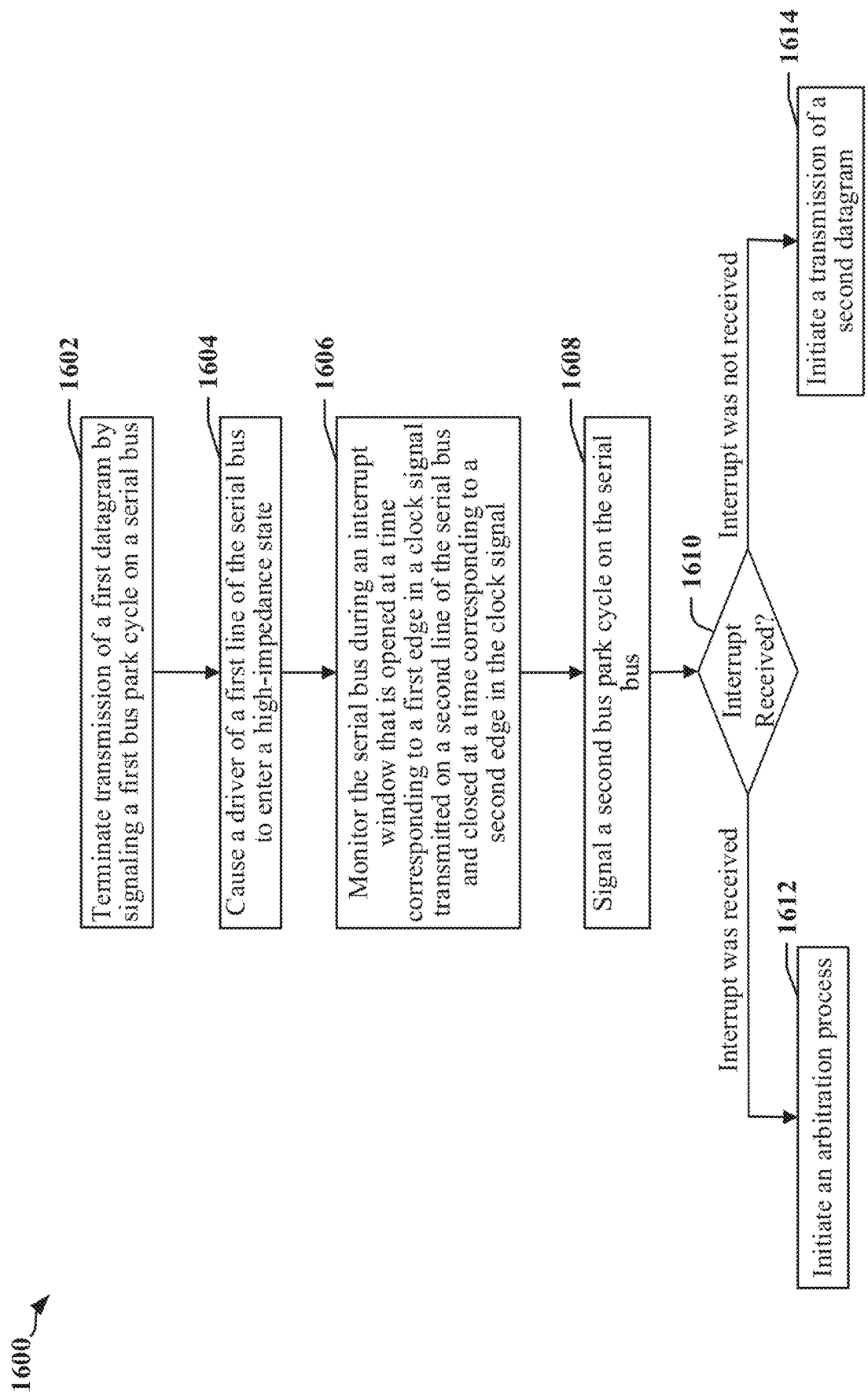
FIG. 16 is a flow chart of a first method of data communication performed at a bus master device adapted in accordance with certain aspects disclosed herein.

FIG. 16 is a flow chart 1600 of a method of communication using a serial communication link. The method may be performed at a device operating as a bus master. At block 1602, the device may terminate transmission of a first datagram by signaling a first bus park cycle on a serial bus. At block 1604, the device may cause a driver of a first line of the serial bus to enter a high-impedance state. At block 1606, the device may monitor the serial bus during an interrupt window that is opened at a time corresponding to a first edge in a clock signal transmitted on a second line of the serial bus and closed at a time corresponding to a second edge in the clock signal. At block 1608, the device may signal a second bus park cycle on the serial bus. In one example, the serial bus is operated in accordance with an RFFE protocol. In other examples, the serial bus is operated in accordance with an SPMI protocol, I3C protocol, I2C protocol or other serial protocol.

At block 1610, the device may determine whether an interrupt was received on the first line of the serial bus during the interrupt window. If an interrupt was received on the first line of the serial bus during the interrupt window then, at block 1612, the device may initiate an arbitration process. If an interrupt was not received on the first line of the serial bus while the interrupt window was open then, at block 1614, the device may initiate a transmission of a second datagram when an interrupt was not received on the first line of the serial bus while the interrupt window was open.

In certain implementations, the interrupt window is opened at a rising edge of a first pulse in the clock signal. In one example, the interrupt window is closed at a rising edge of a second pulse in the clock signal. In another example, the interrupt window is closed at a falling edge of a second pulse in the clock signal. In another example, the interrupt window is closed at a falling edge of the first pulse in the clock signal. In the latter example, the first pulse in the clock signal has a duration that is greater than a period of the clock signal transmitted when the second datagram is transmitted.

In some implementations, the interrupt window is opened at a rising edge of a first pulse in the clock signal and closed at an edge of a second pulse in the clock signal and the method includes providing at least one additional pulse in the clock signal after the first pulse and before the second pulse. One or more devices coupled to the serial bus may be configured to launch an interrupt upon detecting a rising edge of the at least one additional pulse.

In some implementations, the device may deter assertion of an interrupt after transmitting a third datagram by suppressing edges in the clock signal between two bus park cycles provided after the third datagram.

In one example, initiating the arbitration process includes transmitting an interrupt sequence identification datagram over the serial bus.

In one example, the method includes designating as a winner of the arbitration process, a device that transmits a highest-value address on the serial bus during the arbitration process. In one example, the method includes designating as a winner of the arbitration process, a device that transmits a lowest-value address on the serial bus during the arbitration process.

In certain instances, initiating the arbitration process includes providing a third edge in the clock signal, enabling a line driver concurrently with providing the third edge, providing a fourth edge in the clock signal, and disabling the line driver after providing the fourth edge. The third edge may include a transition of signaling state in a first direction and the fourth edge may include a transition of signaling state in the first direction. The third edge may include a transition of signaling state in a first direction and the fourth edge may include a transition of signaling state in a second direction.

Figure 17:
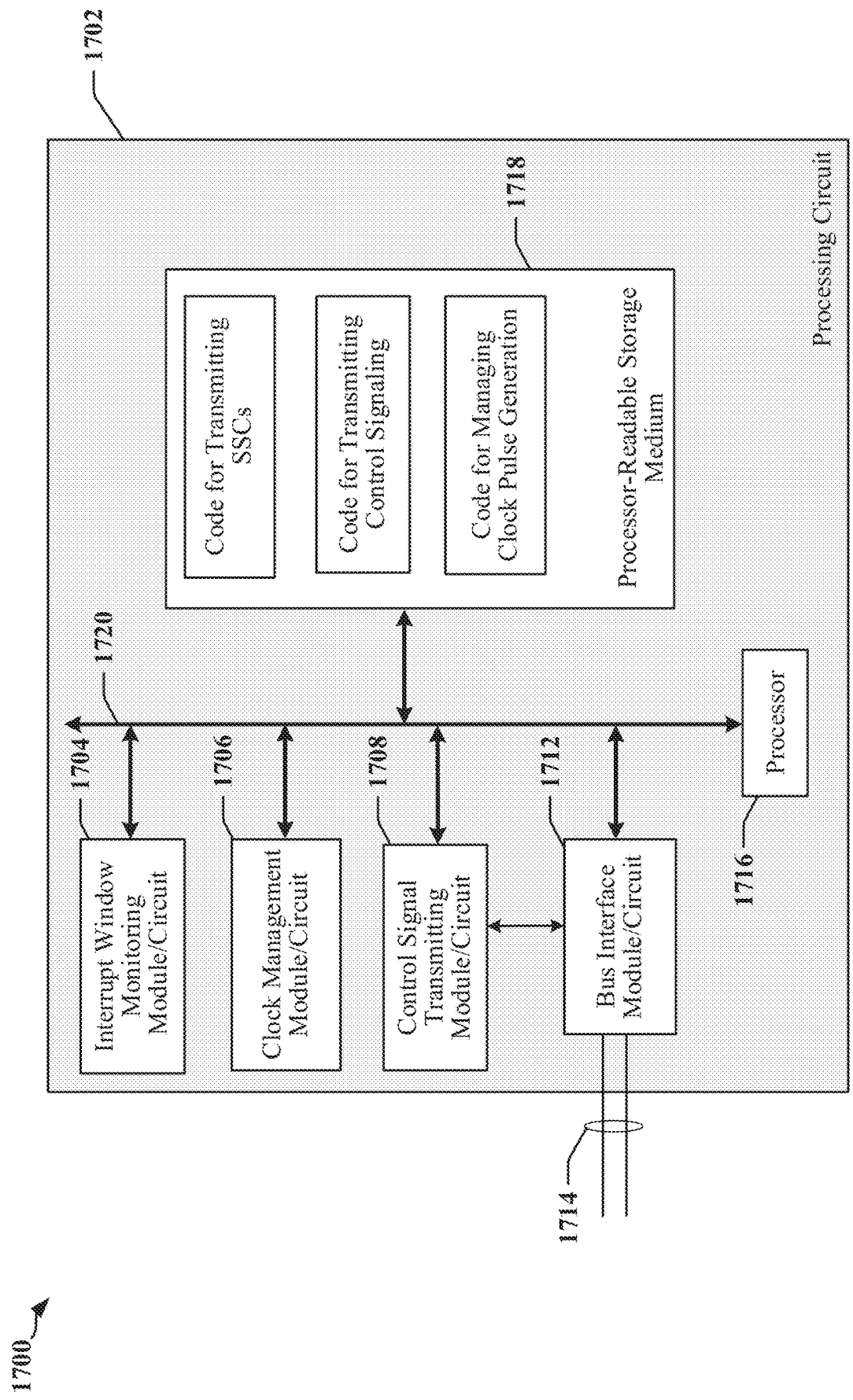
FIG. 17 is a diagram illustrating an example of a hardware implementation for a transmitting apparatus and employing a processing circuit adapted according to certain aspects disclosed herein.

FIG. 17 is a diagram illustrating a simplified example of a hardware implementation for an apparatus 1700 employing a processing circuit 1702. The processing circuit typically has a processor 1716 that may include one or more of a microprocessor, microcontroller, digital signal processor, a sequencer and a state machine. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706, 1708, line interface circuits 1712 configurable to support communication over connectors or wires of a serial bus 1714 and the computer-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium may also be used for storing data that is manipulated by the processor 1716 when executing software, including data decoded from symbols transmitted over the connectors or wires of the serial bus 1714, which may be configured as data lanes and clock lanes. The processing circuit 1702 further includes at least one of the modules or circuits 1704, 1706, 1708. The modules or circuits 1704, 1706, 1708 may be software modules running in the processor 1716, resident/stored in the computer-readable storage medium 1718, one or more hardware modules coupled to the processor 1716, or some combination thereof. The modules or circuits 1704, 1706, 1708 may include microcontroller instructions, state machine configuration parameters, or some combination thereof.

In one configuration, the apparatus 1700 includes a module or circuit 1708 that is configured to configure and transmit control signaling through the line interface circuits 1712, a module or circuit 1706 configured to manage clock generation, and a module or circuit 1704 configured to monitor and manage interrupt windows.

In certain implementations, the apparatus 1700 includes a processor 1716 and line interface circuits 1712 adapted to couple the apparatus 1700 to a serial bus 1714. The processing circuit 1702 may be configured to terminate transmission of a first datagram by signaling a first bus park cycle on the serial bus 1714, cause a driver of a first line of the serial bus 1714 to enter a high-impedance state, monitor the serial bus 1714 during an interrupt window that is opened at a time corresponding to a first edge in a clock signal transmitted on a second line of the serial bus and closed at a time corresponding to a second edge in the clock signal, signal a second bus park cycle on the serial bus 1714, initiate an arbitration process when an interrupt was received on the first line of the serial bus 1714 during the interrupt window, and initiate a transmission of a second datagram when an interrupt was not received on the first line of the serial bus during the interrupt window. In one example, the serial bus 1714 may be operated in accordance with an RFFE protocol. In other examples, the serial bus 1714 is operated in accordance with an SPMI protocol, I3C protocol, I2C protocol or other serial protocol.

In certain examples, the interrupt window is opened at a rising edge of a first pulse in the clock signal. The interrupt window may be closed at a rising edge of a second pulse in the clock signal. The interrupt window may be closed at a falling edge of a second pulse in the clock signal. The interrupt window may be closed at a falling edge of the first pulse in the clock signal, when the first pulse in the clock signal has a duration that is greater than a period of the clock signal transmitted when the second datagram is transmitted.

In some examples, the interrupt window is opened at a rising edge of a first pulse in the clock signal and closed at an edge of a second pulse in the clock signal, and the processing circuit 1702 may be further configured to provide at least one additional pulse in the clock signal after the first pulse and before the second pulse. One or more devices coupled to the serial bus may be configured to launch an interrupt upon detecting a rising edge of the at least one additional pulse.

In one example, the processing circuit 1702 may be further configured to transmit an interrupt sequence identification datagram over the serial bus. In one example, the processing circuit 1702 may be further configured to designate as a winner of the arbitration process, a device that transmits a highest-value address on the serial bus during the arbitration process. In one example, the processing circuit 1702 may be further configured to designate as a winner of the arbitration process, a device that transmits a lowest-value address on the serial bus during the arbitration process.

In various examples, the processing circuit 1702 may be further configured to provide a third edge in the clock signal, enable a line driver concurrently with providing the third edge, provide a fourth edge in the clock signal, and disable the line driver after providing the fourth edge. The third edge may include a transition of signaling state in a first direction and the fourth edge includes a transition of signaling state in the first direction. The third edge may include a transition of signaling state in a first direction and the fourth edge includes a transition of signaling state in a second direction.

In certain implementations, the computer-readable storage medium 1718 is non-transitory and has instructions stored thereon which, when executed by at least one processor 1716 or state machine of the processing circuit 1702, cause the processing circuit 1702 to terminate transmission of a first datagram by signaling a first bus park cycle on the serial bus 1714, cause a driver of a first line of the serial bus 1714 to enter a high-impedance state, monitor the serial bus 1714 during an interrupt window that is opened at a time corresponding to a first edge in a clock signal transmitted on a second line of the serial bus 1714 and closed at a time corresponding to a second edge in the clock signal, signal a second bus park cycle on the serial bus 1714, initiate an arbitration process when an interrupt was received on the first line of the serial bus 1714 during the interrupt window, and initiate a transmission of a second datagram when an interrupt was not received on the first line of the serial bus 1714 during the interrupt window. In one example, the serial bus 1714 may be operated in accordance with an RFFE protocol. In other examples, the serial bus 1714 is operated in accordance with an SPMI protocol, I3C protocol, I2C protocol or other serial protocol.

In one example, the interrupt window is opened at a rising edge of a first pulse in the clock signal and closed at an edge of a second pulse in the clock signal. Certain instructions may cause the processing circuit 1702 to provide at least one additional pulse in the clock signal after the first pulse and before the second pulse. The arbitration process may be initiated by providing a third edge in the clock signal, enabling a line driver concurrently with providing the third edge, providing a fourth edge in the clock signal, and disabling the line driver after providing the fourth edge.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a device operating as a bus master, comprising:
    terminating transmission of a first datagram by signaling a first bus park cycle on a serial bus;
    causing a driver of a first line of the serial bus to enter a high-impedance state;
    monitoring the serial bus during an interrupt window that is opened at a time corresponding to a first edge in a clock signal transmitted on a second line of the serial bus and closed at a time corresponding to a second edge in the clock signal;
    signaling a second bus park cycle on the serial bus;
    initiating an arbitration process when an interrupt was received on the first line of the serial bus during the interrupt window; and
    initiating transmission of a second datagram when an interrupt was not received on the first line of the serial bus during the interrupt window.

2. The method of claim 1, wherein the serial bus is operated in accordance with a radio frequency front-end protocol.

3. The method of claim 1, wherein the interrupt window is opened at a rising edge of a first pulse in the clock signal and closed at a rising edge of a second pulse in the clock signal.

4. The method of claim 1, wherein the interrupt window is opened at a rising edge of a first pulse in the clock signal and closed at a falling edge of a second pulse in the clock signal.

5. The method of claim 1, wherein the interrupt window is opened at a rising edge of a first pulse in the clock signal and closed at a falling edge of the first pulse in the clock signal, and wherein the first pulse in the clock signal has a duration that is greater than a period of the clock signal transmitted when the second datagram is transmitted.

6. The method of claim 1, wherein the interrupt window is opened at a rising edge of a first pulse in the clock signal and closed at an edge of a second pulse in the clock signal, further comprising:
    providing at least one additional pulse in the clock signal after the first pulse and before the second pulse.

7. The method of claim 6, wherein one or more devices coupled to the serial bus are configured to launch an interrupt upon detecting a rising edge of the at least one additional pulse.

8. The method of claim 1, wherein initiating the arbitration process comprises:
    transmitting an interrupt sequence identification datagram over the serial bus.

9. The method of claim 1, further comprising:
    designating as a winner of the arbitration process, a device that transmits a highest-value address on the serial bus during the arbitration process.

10. The method of claim 1, further comprising:
designating as a winner of the arbitration process, a device that transmits a lowest-value address on the serial bus during the arbitration process.

11. The method of claim 1, further comprising:
deterring assertion of an interrupt after transmitting a third datagram by suppressing edges in the clock signal between two bus park cycles provided after transmitting the third datagram.

12. The method of claim 1, wherein initiating the arbitration process comprises:
providing a third edge in the clock signal;
enabling a line driver concurrently with providing the third edge;
providing a fourth edge in the clock signal; and
disabling the line driver after providing the fourth edge.

13. The method of claim 12, wherein the third edge comprises a transition of signaling state in a first direction and the fourth edge comprises a transition of signaling state in the first direction.

14. The method of claim 12, wherein the third edge comprises a transition of signaling state in a first direction and the fourth edge comprises a transition of signaling state in a second direction.

15. An apparatus, comprising:
a bus interface adapted to couple the apparatus to a serial bus; and
a processing circuit configured to:
terminate transmission of a first datagram by signaling a first bus park cycle on the serial bus;
cause a driver of a first line of the serial bus to enter a high-impedance state;
monitor the serial bus during an interrupt window that is opened at a time corresponding to a first edge in a clock signal transmitted on a second line of the serial bus and closed at a time corresponding to a second edge in the clock signal;
signal a second bus park cycle on the serial bus;
initiate an arbitration process when an interrupt was received on the first line of the serial bus during the interrupt window; and
initiate transmission of a second datagram when an interrupt was not received on the first line of the serial bus during the interrupt window.

16. The apparatus of claim 15, wherein the serial bus is operated in accordance with a radio frequency front-end protocol.

17. The apparatus of claim 15, wherein the interrupt window is opened at a rising edge of a first pulse in the clock signal and closed at a rising edge of a second pulse in the clock signal.

18. The apparatus of claim 15, wherein the interrupt window is opened at a rising edge of a first pulse in the clock signal and closed at a falling edge of a second pulse in the clock signal.

19. The apparatus of claim 15, wherein the interrupt window is opened at a rising edge of a first pulse in the clock signal and closed at a falling edge of the first pulse in the clock signal, and wherein the first pulse in the clock signal has a duration that is greater than a period of the clock signal transmitted when the second datagram is transmitted.

20. The apparatus of claim 15, wherein the interrupt window is opened at a rising edge of a first pulse in the clock signal and closed at an edge of a second pulse in the clock signal and wherein the processing circuit is further configured to:
provide at least one additional pulse in the clock signal after the first pulse and before the second pulse.

21. The apparatus of claim 20, wherein one or more devices coupled to the serial bus are configured to launch an interrupt upon detecting a rising edge of the at least one additional pulse.

22. The apparatus of claim 15, wherein the processing circuit is further configured to:
transmit an interrupt sequence identification datagram over the serial bus.

23. The apparatus of claim 15, wherein the processing circuit is further configured to:
designate as a winner of the arbitration process, a device that transmits a highest-value address on the serial bus during the arbitration process.

24. The apparatus of claim 15, wherein the processing circuit is further configured to:
designate as a winner of the arbitration process, a device that transmits a lowest-value address on the serial bus during the arbitration process.

25. The apparatus of claim 15, wherein the processing circuit is further configured to:
provide a third edge in the clock signal;
enable a line driver concurrently with providing the third edge;
provide a fourth edge in the clock signal; and
disable the line driver after providing the fourth edge.

26. The apparatus of claim 25, wherein the third edge comprises a transition of signaling state in a first direction and the fourth edge comprises a transition of signaling state in the first direction.

27. The apparatus of claim 25, wherein the third edge comprises a transition of signaling state in a first direction and the fourth edge comprises a transition of signaling state in a second direction.

28. A non-transitory processor-readable storage medium having instructions stored thereon which, when executed by at least one processor or state machine of a processing circuit, cause the processing circuit to:
terminate transmission of a first datagram by signaling a first bus park cycle on a serial bus;
cause a driver of a first line of the serial bus to enter a high-impedance state;
monitor the serial bus during an interrupt window that is opened at a time corresponding to a first edge in a clock signal transmitted on a second line of the serial bus and closed at a time corresponding to a second edge in the clock signal;
signal a second bus park cycle on the serial bus;
initiate an arbitration process when an interrupt was received on the first line of the serial bus during the interrupt window; and
initiate transmission of a second datagram when an interrupt was not received on the first line of the serial bus during the interrupt window.

29. The storage medium of claim 28, wherein the interrupt window is opened at a rising edge of a first pulse in the clock signal and closed at an edge of a second pulse in the clock signal, and wherein the instructions further cause the processing circuit to:
provide at least one additional pulse in the clock signal after the first pulse and before the second pulse.

30. The storage medium of claim 28, wherein the instructions further cause the processing circuit to:
provide a third edge in the clock signal;
enable a line driver concurrently with providing the third edge;

provide a fourth edge in the clock signal; and
disable the line driver after providing the fourth edge.

* * * * *